(12) United States Patent
Saito et al.

(10) Patent No.: US 11,815,799 B2
(45) Date of Patent: Nov. 14, 2023

(54) INFORMATION PROCESSING APPARATUS AND INFORMATION PROCESSING METHOD, IMAGING APPARATUS, MOBILE DEVICE, AND COMPUTER PROGRAM

(71) Applicant: Sony Semiconductor Solutions Corporation, Kanagawa (JP)

(72) Inventors: Hitoshi Saito, Kanagawa (JP); Yoshimitsu Takagi, Tokyo (JP); Toshiki Ono, Tokyo (JP); Masafumi Zama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 16 days.

(21) Appl. No.: 17/274,094

(22) PCT Filed: Jul. 31, 2019

(86) PCT No.: PCT/JP2019/030046
§ 371 (c)(1),
(2) Date: Mar. 5, 2021

(87) PCT Pub. No.: WO2020/054240
PCT Pub. Date: Mar. 19, 2020

(65) Prior Publication Data
US 2021/0218875 A1 Jul. 15, 2021

(30) Foreign Application Priority Data
Sep. 13, 2018 (JP) .................................. 2018-171382

(51) Int. Cl.
*G03B 7/28* (2021.01)
*G06V 20/56* (2022.01)
(Continued)

(52) U.S. Cl.
CPC ............... *G03B 7/28* (2013.01); *G06V 10/98* (2022.01); *G06V 20/56* (2022.01); *G06V 20/588* (2022.01);
(Continued)

(58) Field of Classification Search
CPC .... H04N 5/2353; H04N 5/2351; H04N 5/243; H04N 7/183; H04N 5/235;
(Continued)

(56) References Cited

U.S. PATENT DOCUMENTS 9,294,681 B2    3/2016  Murao
11,039,078 B2 *  6/2021  Fendt ..................... H04N 7/181
(Continued)

FOREIGN PATENT DOCUMENTS

JP    2005167842 A    6/2005
JP    2010-215029 A   9/2010
(Continued)

OTHER PUBLICATIONS

International Search Report and English translation thereof dated Oct. 29, 2019 in connection with International Application No. PCT/JP2019/030046.
(Continued)

*Primary Examiner* — Jason A Flohre
(74) *Attorney, Agent, or Firm* — Wolf, Greenfield & Sacks, P.C.

(57) ABSTRACT

Provided are an information processing apparatus and an information processing method, an imaging apparatus, a mobile device, and a computer program that performs processing for controlling exposure of an in-vehicle camera. The information processing apparatus includes: a recognition unit that recognizes an image after an output signal of an image sensor is processed by a processing unit; and a control unit that controls at least one of imaging operation of
(Continued)

the image sensor or processing operation in the processing unit on the basis of a recognition result of the recognition unit. The image sensor is mounted on a vehicle and used, and the recognition unit image-recognizes at least a surrounding vehicle or a road surface. Then, the control unit controls detection or development processing of the region of the surrounding vehicle or the road surface in the image.

17 Claims, 18 Drawing Sheets

(51) Int. Cl.
    *H04N 23/73*     (2023.01)
    *G06V 10/98*     (2022.01)
    *G06V 20/58*     (2022.01)

(52) U.S. Cl.
    CPC ............. *H04N 23/73* (2023.01); *G06V 20/58* (2022.01); *G06V 20/582* (2022.01); *G06V 20/584* (2022.01)

(58) Field of Classification Search
    CPC ............. H04N 5/23218; H04N 5/2253; H04N 5/2257; G06V 20/588; G06V 20/58; G06V 20/582; G06V 20/584; G06V 10/98; G06V 20/56; G03B 7/091; G03B 7/28; G06T 5/40; G06T 7/20
    See application file for complete search history.

(56) References Cited

U.S. PATENT DOCUMENTS

| | | | |
|---|---|---|---|
| 2006/0239509 A1* | 10/2006 | Saito | G06V 10/753 701/1 |
| 2008/0012942 A1 | 1/2008 | Borisov | |
| 2008/0309517 A1* | 12/2008 | Saito | B60R 1/00 340/937 |
| 2009/0028389 A1* | 1/2009 | Edanami | G06T 7/73 382/104 |
| 2012/0185167 A1* | 7/2012 | Higuchi | G08G 1/167 382/104 |
| 2014/0139619 A1 | 5/2014 | Wang | |
| 2014/0204267 A1* | 7/2014 | Akiba | H04N 5/2353 348/362 |
| 2014/0267544 A1 | 9/2014 | Li | |
| 2015/0109164 A1* | 4/2015 | Takaki | G01S 13/931 342/27 |
| 2017/0177955 A1* | 6/2017 | Yokota | G01S 13/931 |
| 2017/0364765 A1* | 12/2017 | Nakata | H04N 7/18 |
| 2018/0139368 A1* | 5/2018 | Nakayama | B60R 1/00 |
| 2018/0284798 A1* | 10/2018 | Kita | G06V 10/457 |
| 2018/0293447 A1* | 10/2018 | Kawano | G06T 7/277 |
| 2019/0092239 A1* | 3/2019 | Yamada | B60R 1/002 |
| 2020/0010088 A1* | 1/2020 | Kokaki | B60W 30/143 |

FOREIGN PATENT DOCUMENTS

| | | | | |
|---|---|---|---|---|
| JP | 2011254340 A | | 12/2011 | |
| WO | WO-2016194296 A1 | * | 12/2016 | ............... B60Q 9/00 |
| WO | WO-2017071996 A1 | | 5/2017 | |

OTHER PUBLICATIONS

International Written Opinion and English translation thereof dated Oct. 29, 2019 in connection with International Application No. PCT/JP2019/030046.

International Preliminary Report on Patentability and English translation thereof dated Mar. 25, 2021 in connection with International Application No. PCT/JP2019/030046.

Extended European Search Report dated Oct. 8, 2021 in connection with European Application No. 19858980.6.

* cited by examiner

INFORMATION PROCESSING APPARATUS AND INFORMATION PROCESSING METHOD, IMAGING APPARATUS, MOBILE DEVICE, AND COMPUTER PROGRAM

CROSS-REFERENCE TO RELATED APPLICATIONS

This application claims the benefit under 35 U.S.C. § 371 as a U.S. National Stage Entry of International Application No. PCT/JP2019/030046, filed in the Japanese Patent Office as a Receiving Office on Jul. 31, 2019, which claims priority to Japanese Patent Application Number JP2018-171382, filed in the Japanese Patent Office on Sep. 13, 2018, each of which is hereby incorporated by reference in its entirety.

TECHNICAL FIELD

The technology disclosed herein relates to an information processing apparatus and an information processing method, an imaging apparatus, a mobile device, and a computer program that performs processing for controlling exposure of an in-vehicle camera.

BACKGROUND ART

In order to realize the automatic driving and the advanced driver assistance system (ADAS), it is necessary to detect various objects such as other vehicles, people, and lanes, and furthermore, it is necessary to detect objects in various environments not only in the daytime in fine weather, but also in rainy weather and at night. For this reason, various external recognition sensors such as cameras, millimeter-wave radars, and laser radars are beginning to be mounted in vehicles.

For example, an exposure control device has been proposed that measures the brightness farther than a recognition region in a captured image by an in-vehicle camera, detects a change in brightness by comparing the measured brightness with a time difference, predicts the timing at which the change in brightness occurs in the recognition region on the basis of the traveling speed of the vehicle, and performs exposure control of the in-vehicle camera at the predicted timing (see Patent Document 1).

Furthermore, a method for determining an exposure control value of an in-vehicle camera has been proposed, the method including detecting a target from a captured image by an in-vehicle camera in a state where the target is arranged in an imaging range, measuring the luminance of the target in the detected captured image, and calculating an exposure control value for setting the measured luminance as a target value suitable for target recognition (see Patent Document 2).

Furthermore, an exposure control method of an in-vehicle monitor camera has been proposed, the in-vehicle monitor camera having a function of auto-bracketing imaging of performing auto-bracketing imaging with a predetermined reference exposure value, and then selecting image data of appropriate exposure or closest to appropriate exposure from obtained plurality of pieces of image data, to set the selected image data as a new reference exposure value (see Patent Document 3).

CITATION LIST

Patent Document

Patent Document 1: Japanese Patent Application Laid-Open No. 2012-134845
Patent Document 2: Japanese Patent Application Laid-Open No. 2012-138688
Patent Document 3: Japanese Patent Application Laid-Open No. 2012-138688

SUMMARY OF THE INVENTION

Problems to be Solved by the Invention

An object of the technology disclosed herein is to provide an information processing apparatus and an information processing method, an imaging apparatus, a mobile device, and a computer program that performs processing for controlling exposure of an in-vehicle camera.

Solutions to Problems

A first aspect of the technology disclosed herein is
an information processing apparatus including:
a recognition unit that recognizes an image after an output signal of an image sensor is processed by a processing unit; and
a control unit that controls at least one of imaging operation of the image sensor or processing operation in the processing unit on the basis of a recognition result of the recognition unit.

The image sensor is mounted on a vehicle and used, and the recognition unit image-recognizes at least a surrounding vehicle or a road surface. Then, the control unit controls detection or development processing of the region of the surrounding vehicle or the road surface in the image.

Furthermore, a second aspect of the technology disclosed herein is
an information processing method including:
a recognition step of recognizing an image after an output signal of an image sensor is processed by a processing unit; and
a control step of controlling at least one of imaging operation of the image sensor or processing operation in the processing unit on the basis of a recognition result in the recognition step.

Furthermore, a third aspect of the technology disclosed herein is
an imaging apparatus including:
an image sensor;
a processing unit that processes an output signal of the image sensor;
a recognition unit that recognizes an image after being processed by the processing unit; and
a control unit that controls at least one of imaging operation of the image sensor or processing operation in the processing unit on the basis of a recognition result of the recognition unit.

Furthermore, a fourth aspect of the technology disclosed herein is
a mobile device including:
a mobile body;
an image sensor mounted on the mobile body;
a processing unit that processes an output signal of the image sensor;

a recognition unit that recognizes an image after being processed by the processing unit;

a control unit that controls at least one of imaging operation of the image sensor or processing operation in the processing unit on the basis of a recognition result of the recognition unit; and an operation control unit that controls operation in the mobile body on the basis of a result of recognition of a captured image by the image sensor under control of the control unit.

Furthermore, a fifth aspect of the technology disclosed herein is a computer program written in a computer-readable format to cause a computer to function as a recognition unit that recognizes an image after an output signal of an image sensor is processed by a processing unit, and a control unit that controls at least one of imaging operation of the image sensor or processing operation in the processing unit on the basis of a recognition result of the recognition unit.

The computer program according to the fifth aspect defines a computer program written in a computer-readable format so as to realize predetermined processing on a computer. In other words, by installing the computer program according to the fifth aspect into a computer, a cooperative action is exhibited on the computer, and a similar effect to the information processing apparatus according to the first aspect can be obtained.

Effects of the Invention

According to the technology disclosed herein, an information processing apparatus and an information processing method, imaging apparatus, a mobile device, and a computer program that performs processing for controlling exposure of an in-vehicle camera can be provided.

Note that the effects described in the present specification are merely examples, and the effects of the present invention are not limited thereto. Furthermore, in addition to the above effects, the present invention may further exert additional effects.

Still other objects, features, and advantages of the technology disclosed in the present specification will become apparent from a detailed description based on embodiments as described later and accompanying drawings.

MODE FOR CARRYING OUT THE INVENTION

Hereinafter, embodiments of the technology disclosed in the present specification will be described in detail with reference to the drawings.

Figure 1:
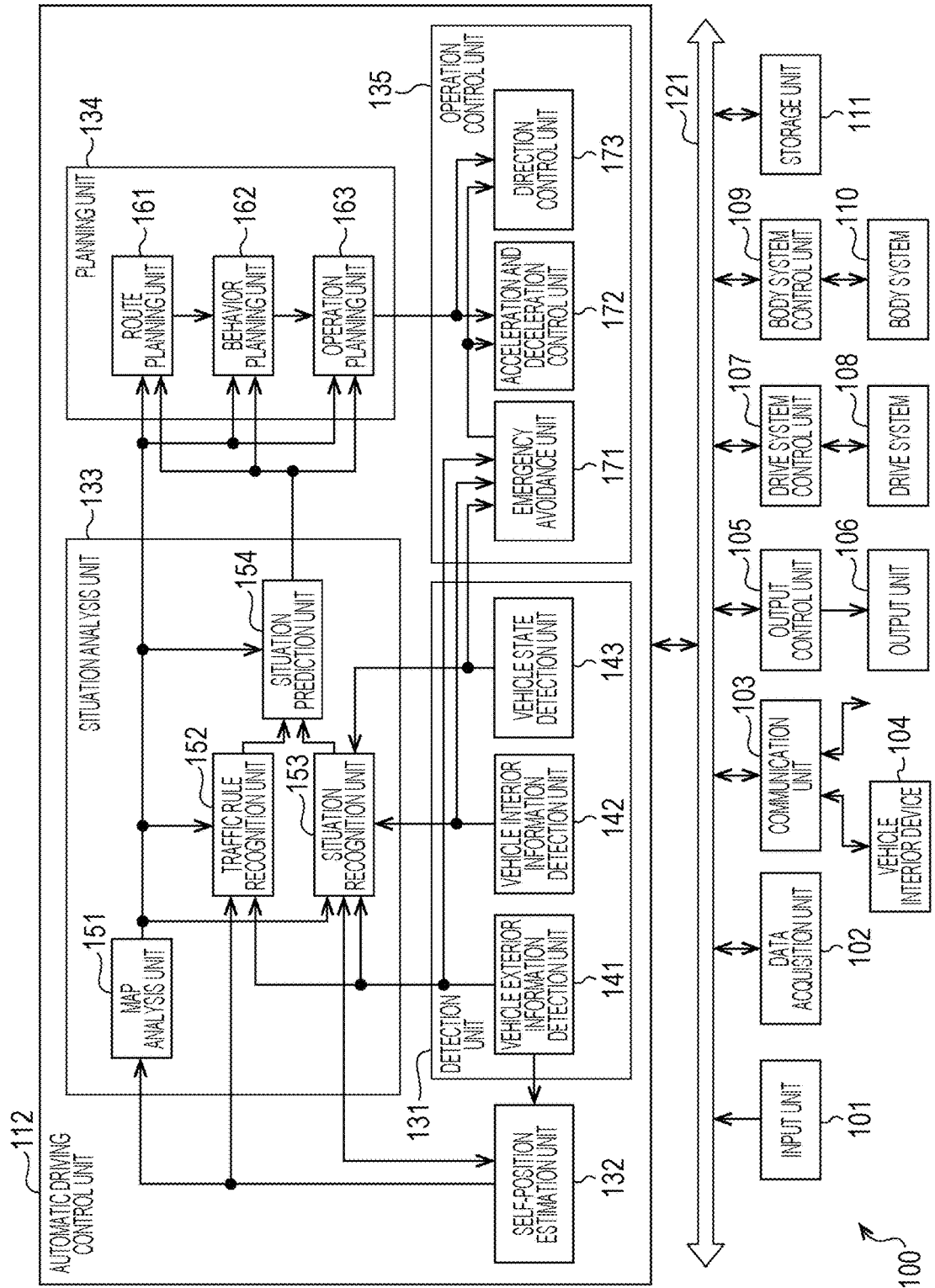
FIG. 1 is a block diagram showing a schematic function configuration example of a vehicle control system 100.

FIG. 1 is a block diagram showing a schematic function configuration example of a vehicle control system 100 which is an example of a mobile body control system to which the present technology can be applied.

Note that, hereinafter, in a case of distinguishing a vehicle provided with the vehicle control system 100 from other vehicles, the vehicle is referred to as own vehicle.

The vehicle control system 100 includes an input unit 101, a data acquisition unit 102, a communication unit 103, a vehicle interior device 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are connected to each other via a communication network 121. The communication network 121 may be, for example, an in-vehicle communication network, a bus, or the like conforming to an arbitrary standard such as the controller area network (CAN), the local interconnect network (LIN), the local area network (LAN), or the FlexRay (registered trademark). Note that each unit of the vehicle control system 100 is directly connected without using the communication network 121 in some cases.

Note that, hereinafter, in a case where each unit of the vehicle control system 100 communicates via the communication network 121, the description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes a device used by a passenger to input various types of data and instructions. For example, the input unit 101 includes an operation device such as a touch panel, a button, a microphone, a switch, and a lever, and an operation device in which input can be performed by a method other than manual operation such as voice or gesture. Furthermore, for example, the input unit 101 may be a remote control device that uses infrared rays or other radio waves, or an externally connected device such as a mobile device or a wearable device that corresponds to the operation of the vehicle control system 100. The input unit 101 generates an input signal on the basis of the data and instructions input by the passenger, and supplies the input signal to each unit of the vehicle control system 100.

The data acquisition unit 102 includes various sensors that acquire data used for processing of the vehicle control system 100, and supplies the acquired data to each unit of the vehicle control system 100.

For example, the data acquisition unit 102 includes various sensors for detecting the state of own vehicle and the like. Specifically, for example, the data acquisition unit 102 includes, for example, a gyro sensor, an acceleration sensor, an inertial measurement unit (IMU), a sensor for detecting an operation amount of an accelerator pedal, an operation amount of a brake pedal, steering of a steering wheel, an engine rotation speed, a motor rotation speed, or a wheel rotation speed, and the like.

Furthermore, for example, the data acquisition unit 102 includes various sensors for detecting information outside own vehicle. Specifically, for example, the data acquisition unit 102 includes an imaging apparatus such as a time of flight (ToF) camera, a stereo camera, a monocular camera, an infrared camera, and other cameras. Furthermore, for example, the data acquisition unit 102 includes an environment sensor for detecting weather, climate, or the like, and an ambient information detection sensor for detecting an object around own vehicle. The environment sensor includes, for example, a raindrop sensor, a fog sensor, a sunshine sensor, a snow sensor, and the like. For example, the ambient information detection sensor includes an ultrasonic sensor, a radar, a light detection and ranging, laser imaging detection and ranging (LIDAR) device, a sonar, and the like.

Moreover, for example, the data acquisition unit 102 includes various sensors for detecting the current position of own vehicle. Specifically, for example, the data acquisition unit 102 includes a global navigation satellite system (GNSS) receiver that receives a GNSS signal from a GNSS satellite, and the like.

Furthermore, for example, the data acquisition unit 102 includes various sensors for detecting information inside the vehicle. Specifically, for example, the data acquisition unit 102 includes an imaging apparatus that images a driver, a biometric sensor that detects biometric information of the driver, a microphone that collects sound in the vehicle interior, and the like. The biometric sensor is provided on, for example, a seating surface, a steering wheel, or the like, and detects biometric information of an occupant sitting on a seat or a driver holding a steering wheel.

The communication unit 103 communicates with the vehicle interior device 104 and various devices outside the vehicle, a server, a base station, and the like, transmits data supplied from each unit of the vehicle control system 100, and supplies the received data to each unit of the vehicle control system 100. Note that the communication protocol supported by the communication unit 103 is not particularly limited, and furthermore, the communication unit 103 can support a plurality of types of communication protocols.

For example, the communication unit 103 performs wireless communication with the vehicle interior device 104 by wireless LAN, Bluetooth (registered trademark), near field communication (NFC), or a wireless USB (WUSB). Furthermore, for example, the communication unit 103 performs communication by wire with the vehicle interior device 104 by a universal serial bus (USB), a high-definition multimedia interface (HDMI), or a mobile high-definition link (MHL) via a connection terminal not shown (and a cable if necessary).

Moreover, for example, the communication unit 103 performs communication with a device (for example, an application server or a control server) existing on an external network (for example, the Internet, a cloud network, or a company specific network) via a base station or an access point. Furthermore, for example, the communication unit 103 uses, the peer to peer (P2P) technology to perform with a terminal existing in the vicinity of own vehicle (for example, a terminal of a pedestrian, or a shop, or a machine type communication (MTC) terminal). Moreover, for example, the communication unit 103 performs V2X communication such as a vehicle to vehicle communication, a vehicle to infrastructure communication, an own vehicle to home communication, and a vehicle to pedestrian communication. Furthermore, for example, the communication unit 103 includes a beacon reception unit, receives radio waves or electromagnetic waves transmitted from a radio station or the like installed on the road, and acquires information such as the current position, congestion, road closure, or required time.

The vehicle interior device 104 includes, for example, a mobile device or a wearable device possessed by an occupant, an information device carried in or attached to own vehicle, a navigation device that searches for a route to an arbitrary destination, and the like.

The output control unit 105 controls the output of various types of information to the occupants of own vehicle or the outside of the vehicle. For example, the output control unit 105 generates an output signal including at least one of visual information (for example, image data) and auditory information (for example, audio data), and supplies the output signal to the output unit 106 to control the output of visual and auditory information from the output unit 106. Specifically, for example, the output control unit 105 synthesizes image data captured by different imaging apparatuses of the data acquisition unit 102 to generate a bird's-eye image or a panoramic image, and supplies an output signal including the generated image to the output unit 106. Furthermore, for example, the output control unit 105 generates audio data including a warning sound or a warning message for a danger such as collision, contact, or entry into a dangerous zone, and supplies an output signal including the generated audio data to the output unit 106.

The output unit 106 includes a device capable of outputting visual information or auditory information to an occupant of own vehicle or outside the vehicle. For example, the output unit 106 includes a display device, an instrument panel, an audio speaker, headphones, a wearable device such as a glasses-type display worn by an occupant, a projector, a lamp, and the like. The display device included in the output unit 106 may be, in addition to a device having a normal display, for example, a display device that displays visual information in a visual field of a driver such as a head-up display, a transmissive display, or a device having an augmented reality (AR) display function.

The drive system control unit 107 controls the drive system 108 by generating various control signals and supplying the control signals to the drive system 108. Furthermore, the drive system control unit 107 supplies a control signal to each unit other than the drive system 108 as necessary to notify the control state of the drive system 108 and the like.

The drive system 108 includes various devices related to the drive system of own vehicle. For example, the drive system 108 includes a drive force generation device for generating a drive force of an internal combustion engine or a drive motor, a drive force transmission mechanism for transmitting the drive force to the wheels, a steering mechanism for adjusting the steering angle, a braking device that generates a braking force, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 as necessary to notify the control state of the body system 110 and the like.

The body system 110 includes various body-type devices mounted on the vehicle body. For example, the body system 110 includes a keyless entry system, a smart key system, a power window device, a power seat, a steering wheel, an air conditioner, and various lamps (for example, head lamps, a back lamp, a brake lamp, a turn indicator, a fog lamp, and the like), and the like.

The storage unit 111 includes, for example, a magnetic storage device such as a read only memory (ROM), a random access memory (RAM), a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-precision map such as a dynamic map, a global map which is less accurate than the high-precision map and covers a large area, and a local map including information around own vehicle.

The automatic driving control unit 112 performs control related to automatic driving such as autonomous driving or driving assistance. Specifically, for example, the automatic driving control unit 112 performs cooperative control for the purpose of function realization of an advanced driver assistance system (ADAS) including collision avoidance or impact mitigation of own vehicle, follow-up running based on inter-vehicle distance, vehicle speed maintenance running, own vehicle collision warning, own vehicle lane departure warning, or the like. Furthermore, for example, the automatic driving control unit 112 performs cooperative control for the purpose of automatic driving or the like that autonomously runs without depending on the operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the own vehicle on the basis of data or signals from each unit of the vehicle control system 100. For example, the vehicle exterior information detection unit 141 performs detection processing, recognition processing, and tracking processing of an object around the own vehicle, and detection processing of a distance to the object. Examples of objects to be detected include vehicles, people, obstacles, structures, roads, traffic lights, traffic signs, road markings, and the like. Furthermore, for example, the vehicle exterior information detection unit 141 performs processing of detecting the environment around the own vehicle. Examples of the surrounding environment to be detected include weather, temperature, humidity, brightness, road surface condition, and the like. The vehicle exterior information detection unit 141 supplies data indicating the result of the detection processing to the self-position estimation unit 132, a map analysis unit 151 of the situation analysis unit 133, the traffic rule recognition unit 152, a situation recognition unit 153, an emergency avoidance unit 171 of the operation control unit 135, and the like.

The vehicle interior information detection unit 142 performs processing of detecting information of the vehicle inside on the basis of data or signals from each unit of the vehicle control system 100. For example, the vehicle interior information detection unit 142 performs authentication processing and recognition processing of a driver, detection processing of a driver's state, detection processing of an occupant, detection processing of vehicle interior environment, and the like. Examples of the driver's state to be detected include physical condition, arousal level, concentration level, fatigue level, line-of-sight direction, and the like. Examples of the environment inside the vehicle to be detected include temperature, humidity, brightness, odor, and the like. The vehicle interior information detection unit 142 supplies the data indicating the result of the detection processing to the situation recognition unit 153 of the situation analysis unit 133, the emergency avoidance unit 171 of the operation control unit 135, and the like.

The vehicle state detection unit 143 performs detection processing of the state of the own vehicle on the basis of data or signals from each unit of the vehicle control system 100. Examples of the state of the vehicle to be detected include speed, acceleration, steering angle, presence or absence of abnormality, state of driving operation, position and inclination of power seat, state of door lock, and the state of other in-vehicle devices. The vehicle state detection unit 143 supplies the data indicating the result of the detection processing to the situation recognition unit 153 of the situation analysis unit 133, the emergency avoidance unit 171 of the operation control unit 135, and the like.

The self-position estimation unit 132 performs estimation processing of the position and orientation of, for example, the own vehicle on the basis of data or signals from each unit of the vehicle control system 100 such as the vehicle exterior information detection unit 141 and the situation recognition unit 153 of the situation analysis unit 133. Furthermore, the self-position estimation unit 132 generates a local map (hereinafter, referred to as a self-position estimation map) used for estimating the self-position, if necessary. The self-position estimation map is, for example, a highly accurate map using a technique such as simultaneous localization and mapping (SLAM). The self-position estimation unit 132 supplies data indicating the result of the detection processing to the map analysis unit 151 of the situation analysis unit 133, the traffic rule recognition unit 152, the situation recognition unit 153, and the like. Furthermore, the self-position estimation unit 132 causes the storage unit 111 to store the self-position estimation map.

The situation analysis unit 133 performs analysis processing of the situation of the own vehicle and the surroundings. The situation analysis unit 133 includes a map analysis unit 151, a traffic rule recognition unit 152, a situation recognition unit 153, and a situation prediction unit 154.

While using data or signals from each unit of the vehicle control system 100 such as the self-position estimation unit 132 and the vehicle exterior information detection unit 141, the map analysis unit 151 performs analysis processing of various maps stored in the storage unit 111 to construct a map containing information necessary for automatic driving processing. The map analysis unit 151 supplies the constructed map to the traffic rule recognition unit 152, the situation recognition unit 153, the situation prediction unit 154, the route planning unit 161, the behavior planning unit 162, and the operation planning unit 163 of the planning unit 134, and the like.

The traffic rule recognition unit 152 performs recognition processing of traffic rules around the vehicle on the basis of data or signals from each unit of the vehicle control system 100 such as the self-position estimation unit 132, the vehicle exterior information detection unit 141, and the map analysis unit 151. By this recognition processing, for example, the position and state of the signal around the own vehicle, the content of traffic rules around the own vehicle, the lane in which the vehicle can travel, and the like are recognized. The traffic rule recognition unit 152 supplies data indicating the result of the recognition processing to the situation prediction unit 154 and the like.

The situation recognition unit 153 performs recognition processing of a situation related to own vehicle on the basis of data or signals from each unit of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs recognition processing of the situation of the own vehicle, the situation around the own vehicle, the situation of the driver of the own vehicle, and the like. Furthermore, the situation recognition unit 153 also generates a local map (hereinafter, referred to as a situation recognition map) used for recognizing the situation around the own vehicle, if necessary. The situation recognition map is, for example, an occupancy grid map.

Examples of the situation of the own vehicle to be recognized include the position, orientation, movement (for example, speed, acceleration, movement direction, and the like) of the own vehicle, and the presence or absence and content of abnormality. Examples of the situation around the own vehicle to be recognized include the type and position of surrounding stationary objects, the type, position and movement (for example, speed, acceleration, movement direction, and the like) of surrounding moving objects, the configuration of the surrounding road and the condition of the road surface, and the surrounding weather, temperature, humidity, and brightness. Examples of the driver's state to be recognized include physical condition, arousal level, concentration level, fatigue level, line-of-sight movement, driving operation, and the like.

The situation recognition unit 153 supplies data indicating the result of the recognition processing (including a situation recognition map, if necessary) to the self-position estimation unit 132, the situation prediction unit 154, and the like. Furthermore, the situation recognition unit 153 stores the situation recognition map in the storage unit 111.

The situation prediction unit 154 performs processing of predicting the situation regarding the own vehicle on the basis of data or signals from each unit of the vehicle control system 100 such as the map analysis unit 151, the traffic rule recognition unit 152, and the situation recognition unit 153. For example, the situation prediction unit 154 performs a prediction processing of the situation of the own vehicle, the situation around the own vehicle, the situation of the driver, and the like.

Examples of the situation of the own vehicle to be predicted include the behavior of the own vehicle, the occurrence of an abnormality, and the travelable distance. Examples of the situation around the own vehicle to be predicted include the behavior of a moving body around the own vehicle, a change in the state of a signal, and a change in the environment such as weather. Examples of the driver's situation to be predicted include the driver's behavior and physical condition.

The situation prediction unit 154 supplies data indicating the result of the prediction processing, together with the data from the traffic rule recognition unit 152 and the situation recognition unit 153, to the route planning unit 161, the behavior planning unit 162, the operation planning unit 163 of the planning unit 134, and the like.

The route planning unit 161 plans a route to the destination on the basis of data or signals from each unit of the vehicle control system 100 such as the map analysis unit 151 and the situation prediction unit 154. For example, the route planning unit 161 sets a route from the current position to the designated destination on the basis of the global map. Furthermore, for example, the route planning unit 161 appropriately changes the route on the basis of traffic jams, accidents, traffic regulations, construction conditions, and the physical condition of the driver. The route planning unit 161 supplies data indicating the planned route to the behavior planning unit 162 and the like.

The behavior planning unit 162 plans the behavior of own vehicle to safely travel the route planned by the route planning unit 161 within the planned time on the basis of data or signals from each unit of the vehicle control system 100 such as the map analysis unit 151 and the situation prediction unit 154. For example, the behavior planning unit 162 makes a plan of start, stop, traveling direction (for example, forward, backward, left turn, right turn, and direction change), traveling lane, traveling speed, overtaking, and the like. The behavior planning unit 162 supplies data indicating the planned behavior of the own vehicle to the operation planning unit 163 and the like.

The operation planning unit 163 plans the operation of own vehicle to achieve the behavior planned by the behavior planning unit 162 on the basis of data or signals from each unit of the vehicle control system 100 such as the map analysis unit 151 and the situation prediction unit 154. For example, the operation planning unit 163 makes a plan of acceleration, deceleration, traveling track, and the like. The operation planning unit 163 supplies data indicating the planned operation of the own vehicle to the acceleration and deceleration control unit 172 and the direction control unit 173 of the operation control unit 135, and the like.

The operation control unit 135 controls the operation of the own vehicle. The operation control unit 135 includes the emergency avoidance unit 171, the acceleration and deceleration control unit 172, and the direction control unit 173.

The emergency avoidance unit 171 performs detection processing of collision, contact, entrance to a danger zone, abnormality of a driver, abnormality of a vehicle, and the like on the basis of the detection results of the vehicle exterior information detection unit 141, the vehicle interior information detection unit 142, and the vehicle state detection unit 143. In a case where the occurrence of an emergency is detected, the emergency avoidance unit 171 plans the operation of the own vehicle to avoid an emergency such as a sudden stop or a sharp turn. The emergency avoidance unit 171 supplies data indicating the planned operation of the own vehicle to the acceleration and deceleration control unit 172, the direction control unit 173, and the like.

The acceleration and deceleration control unit 172 performs acceleration and deceleration control for realizing the operation of the own vehicle planned by the operation planning unit 163 or the emergency avoidance unit 171. For example, the acceleration and deceleration control unit 172 operates the control target value of the driving force generation device or the braking device for realizing the planned acceleration, deceleration, or sudden stop, and supplies a control command indicating the operated control target value to the drive system control unit 107.

The direction control unit 173 performs direction control for realizing the operation of the own vehicle planned by the operation planning unit 163 or the emergency avoidance unit 171. For example, the direction control unit 173 operates the control target value of the steering mechanism for realizing the traveling track or sharp turn planned by the operation planning unit 163 or the emergency avoidance unit 171, and supplies the control command indicating the operated control target value to the drive system control unit 107.

Various external recognition sensors such as cameras, millimeter-wave radars, and laser radars are beginning to be mounted to vehicles in order to perform more accurate external recognition for the realization of automatic driving and ADAS. Each sensor has its strengths and weaknesses, depending on the detection principle. For example, a camera that images visible light is not good at dark places, and a radar that detects the reflection of radio waves is not good at objects that do not easily reflect radio waves, such as people and animals. Table 1 below summarizes the strengths and weaknesses of radar (millimeter wave radar), cameras, and laser radar (LiDAR). In the table, □ means great strength (has high recognition accuracy), ○ means good (has good recognition accuracy), and p means weak (not sufficient recognition accuracy). Furthermore, by using fusion technology in which two or more sensors, it is possible to realize more accurate external recognition by taking advantage of the characteristics of each sensor.

TABLE 1

| Type of sensor | Rader | Camera | LiDAR |
| --- | --- | --- | --- |
| Measurement distance | ○ | Δ | ⊙ |
| Angle and resolution | Δ | ⊙ | ○ |
| Performance in bad weather | ⊙ | Δ | ○ |

TABLE 1-continued

| Type of sensor | Rader | Camera | LiDAR |
| --- | --- | --- | --- |
| Performance at night | ⊙ | ○ | ⊙ |
| Classification of target object | Δ | ⊙ | ○ |

While the purpose is to view or view the images captured by a general digital camera, the in-vehicle camera is intended to realize automatic driving of the own vehicle such as collision avoidance and lane control and ADAS. Therefore, the present applicant considers that it is preferable that the image captured by the in-vehicle camera is an image with which specific objects such as vehicles, pedestrians, and other obstacles and road surfaces can be image-recognized with high accuracy, rather than an image that faithfully reproduces the captured landscape so that people do not feel uncomfortable when viewing.

In order to improve the accuracy of image recognition, it is necessary to perform imaging under an exposure condition that makes it easy to recognize the object to be recognized. For example, Patent Document 2 discloses a method for determining an exposure control value of an in-vehicle camera, the method including detecting a target from an image captured by an in-vehicle camera in a state where the target is arranged in an imaging range, measuring the luminance of the target in the detected captured image, and calculating an exposure control value for setting the measured luminance as a target value suitable for target recognition. However, it is not possible to scan the target pattern of the target from the range in which the target can exist in the captured image and perform exposure control according to the object having no target pattern. Furthermore, it is not possible to perform exposure control according to the object outside the predetermined range.

Therefore, in the present specification, a technology of obtaining an image with high recognition accuracy for each object by performing automatic exposure control suitable for each object to be recognized on the basis of the recognition result of the image captured by the camera will be proposed below.

First Embodiment

Figure 2:
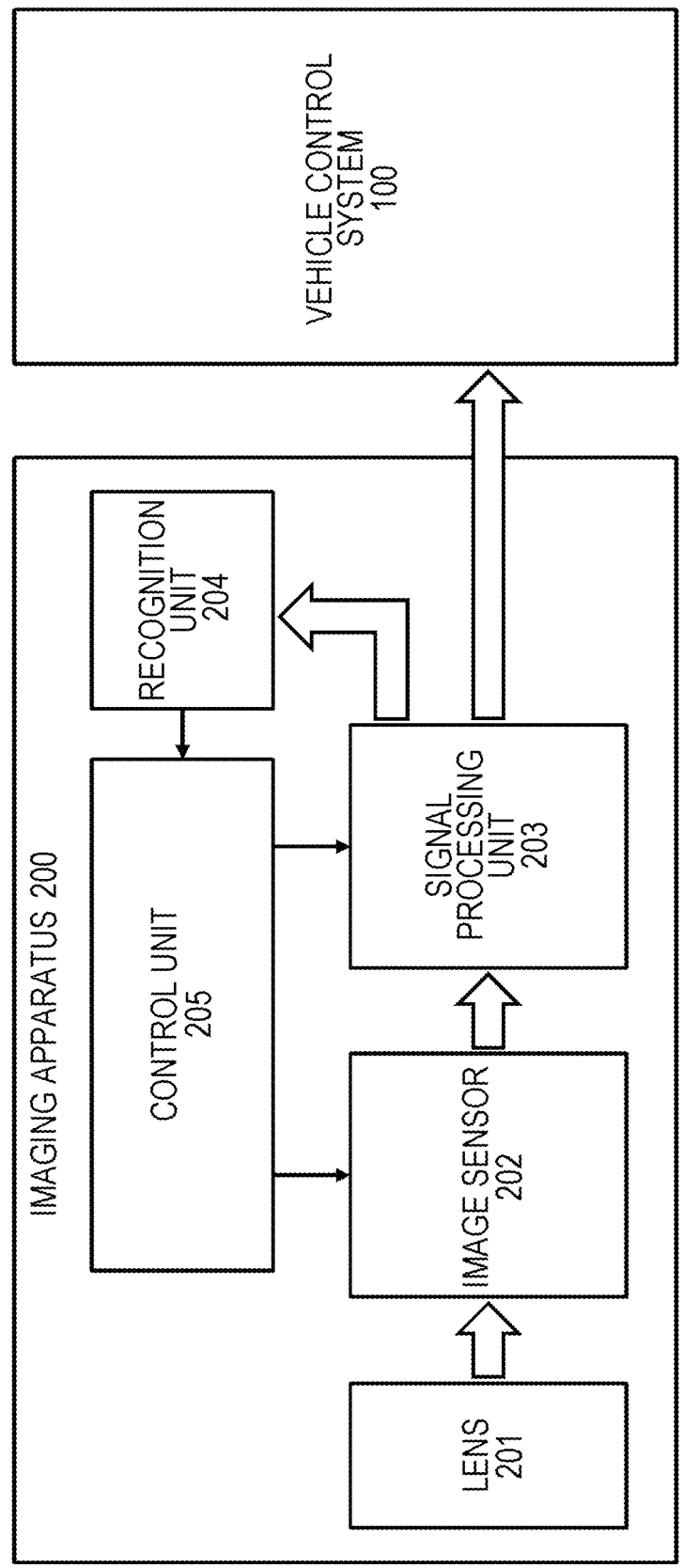
FIG. 2 is a diagram schematically showing a functional configuration example of an imaging apparatus 200 according to a first embodiment.

FIG. 2 schematically shows a functional configuration example of an imaging apparatus 200 according to a first embodiment of the technology disclosed in the present specification. It is assumed that the imaging apparatus 200 is mainly used by being mounted on a vehicle. The imaging apparatus 200 corresponds to one of the imaging apparatus included in the data acquisition unit 102 in the vehicle control system 100. The illustrated imaging apparatus 200 includes a lens 201, an image sensor 202, a signal processing unit 203, a recognition unit 204, and a control unit 205.

The image sensor 202 is configured by using an element such as a complementary metal oxide semiconductor (CMOS) and a charge coupled device (CCD), and captures an image formed on an imaging surface by the lens 201.

The signal processing unit 203 performs processing also called "development" on RAW data output from the image sensor 202. For example, demosaic, noise reduction, white balance adjustment, gamma correction, sensor spectroscopic correction, YC conversion, and the like correspond to the development processing.

The recognition unit 204 recognizes an object included in the captured image after being processed by the signal processing unit 203. The recognition unit 204 recognizes an object that must be recognized or detected in order to realize automatic driving or ADAS, such as a surrounding vehicle or a road surface. Of course, the recognition unit 204 can further include, into the recognition target, other objects such as motorcycles, bicycles, pedestrians, road signs, traffic lights, lanes, medians, guardrails, roadside trees and street lights. Objects to be recognized may be added, deleted, or changed according to the manual operation of the occupant of the own vehicle such as a driver. Furthermore, in a case where the imaging apparatus 200 is used for other one than the in-vehicle camera, an object to be recognized may be added, deleted, or changed according to the application.

The control unit 205 controls the imaging operation of the image sensor 202 and the signal processing of the signal processing unit 203 on the basis of the state of the region of each object recognized by the recognition unit 204 in the captured image by the image sensor 202.

The control unit 205 controls the image sensor 202 and the signal processing unit 203 in order to recognize objects such as vehicles and road surfaces that must be recognized or detected in order to realize automatic driving and ADAS, with high accuracy. Therefore, the image captured by the image sensor 202 under the control of the control unit 205 and developed by the signal processing unit 203 is an image of which image quality is adjusted so that a specific object such as a vehicle or a road surface can be recognized easily in the recognition processing performed in the vehicle control system 100 at the subsequent stage. For this reason, the image output from the imaging apparatus 200 to the vehicle control system 100 is not always a faithful reproduction of the original landscape, and may cause a discomfort feeling when a person views or appreciates the image.

In the vehicle control system 100 at the subsequent stage, by recognizing the image captured by the image sensor 202 and developed by the signal processing unit 203 under the control of the control unit 205, the surrounding vehicles and the road surface can be recognized with high accuracy or high recognition rate. Then, on the basis of such image recognition result, the vehicle control system 100 performs vehicle control for automatic driving or ADAS such as, for example, inter-vehicle control (ACC), lane departure warning (LDW), lane keep assist (LKA), automatic emergency braking (AEB), and blind spot detection (BSD), and also controls the drive of each drive unit such as active cornering light (ACL), brake actuator (BRK), and steering device (STR). This can contribute to the safe driving of the own vehicle.

Figure 3:
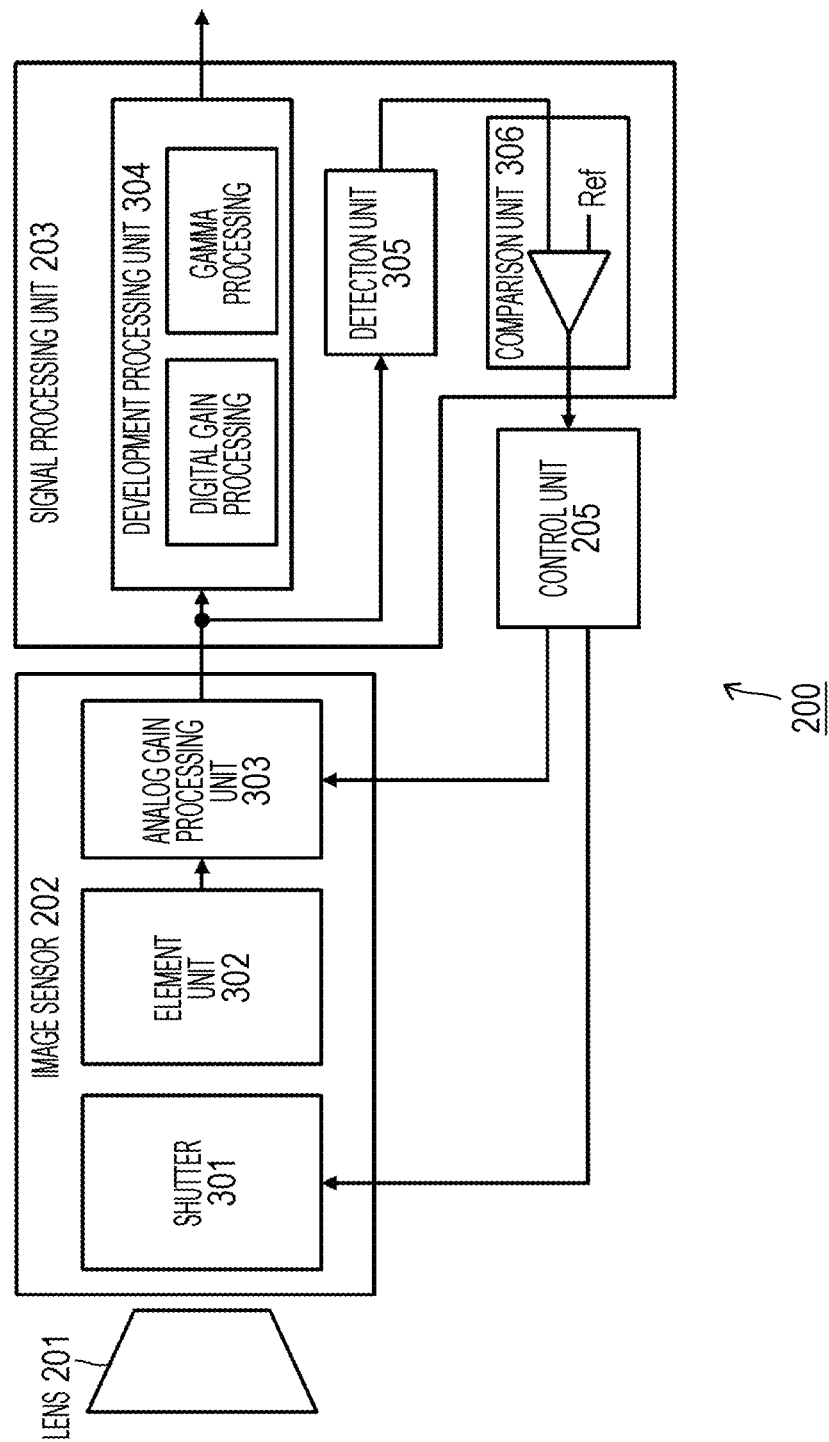
FIG. 3 is a diagram schematically showing a general exposure control loop in an imaging apparatus.

FIG. 3 schematically shows a general exposure control loop in the imaging apparatus 200.

The image sensor 202 includes a shutter 301, an element unit 302, and an analog gain processing unit 303. The light collected by the lens 201 passes through the shutter 301 and reaches the imaging surface of the element unit 302. The element unit 302 includes a two-dimensional pixel array, and a pixel signal corresponding to the amount of received light is output from each pixel. Each pixel signal is amplified in the analog region by the analog gain processing unit 303, and then digitally converted and output to the signal processing unit 203.

The signal processing unit 203 includes a development processing unit 304, a detection unit 305, and a comparison unit 306. The development processing unit 304 performs development processing including digital gain processing and gamma processing on the digital pixel signal output from the image sensor 202. Furthermore, the detection unit 305 detects the brightness (luminance) of the screen by optical detection (OPD) for the entire screen imaged by the image sensor 202. Then, the comparison unit 306 compares the brightness of the entire screen detected by the detection unit 305 with a predetermined reference value (Ref).

The control unit 205 controls the opening and closing timing (that is, the exposure time) of the shutter 301, adjusts the analog gain of the analog gain processing unit 303, and adjusts the digital gain in the development processing unit 304 and other developing parameters on the basis of the difference between the screen brightness and the reference value output from the comparison unit 306 to control the captured image of the image sensor 202 to have an appropriate brightness.

According to the general exposure control loop as shown in FIG. 3, the brightness of the entire screen can be adjusted, but the necessary subject such as surrounding vehicles and road surface is not always captured with appropriate brightness (or brightness suitable for image recognition). For example, when driving under the roadside trees under the scorching sun with strong sunlight, the contrast between the sunlit part and the shaded part is too strong, and there is a concern that the captured image is an image in which the vehicle or road surface in the shaded part cannot be image-recognized with high accuracy.

Figure 4:
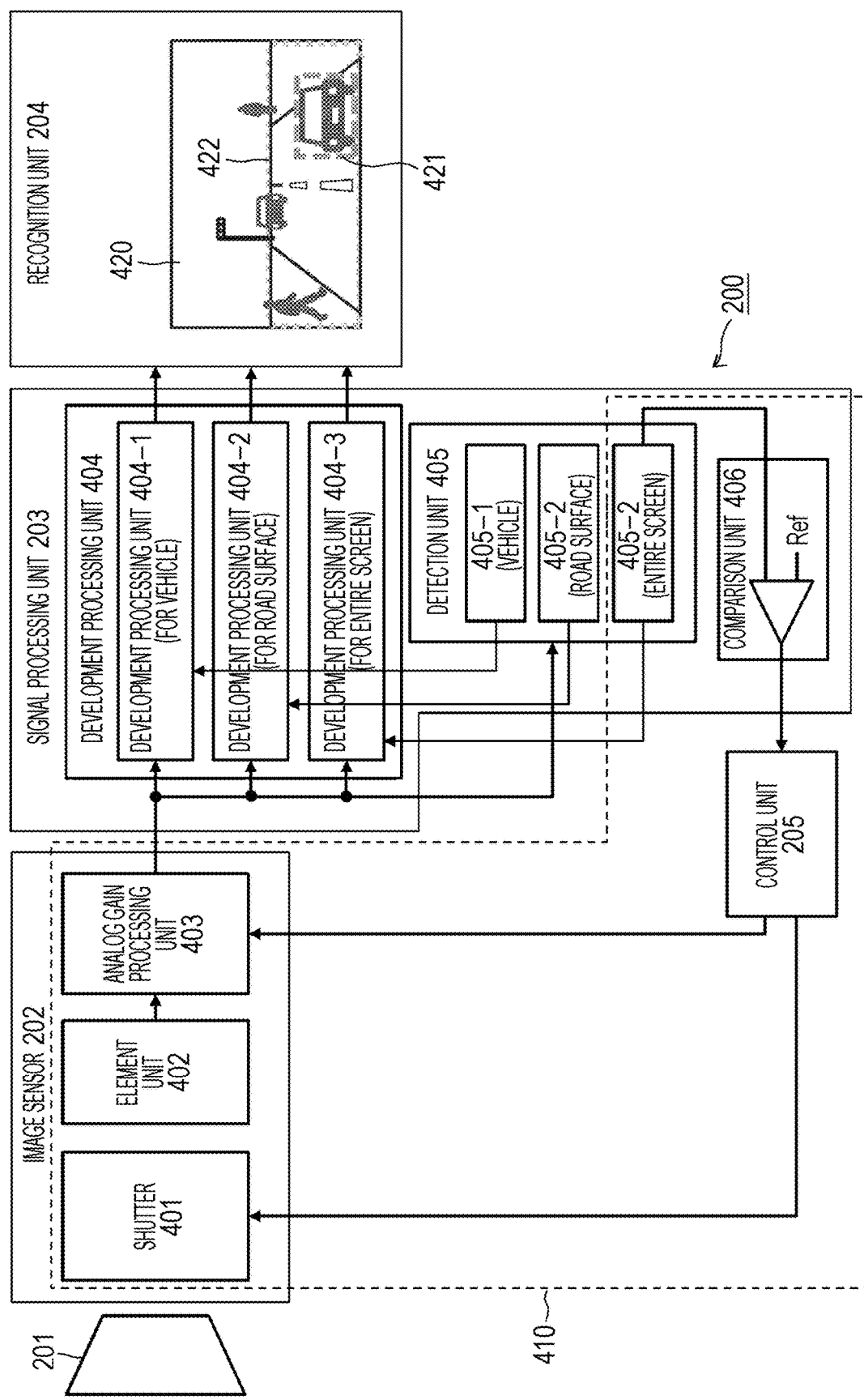
FIG. 4 is a diagram schematically showing an exposure control loop to which the technology disclosed in the present specification is applied.

FIG. 4 schematically shows an exposure control loop to which the technology disclosed in the present specification is applied in the imaging apparatus 200. The control loop shown in FIG. 4 is configured so that the recognition unit 204 performs optimum image creation for each object recognized from the captured image. Here, it is assumed that the recognition unit 204 detects a vehicle (most recent preceding vehicle) and a road surface as objects that must be recognized or detected in order to realize automatic driving and ADAS.

The image sensor 202 includes a shutter 401, an element unit 402, and an analog gain processing unit 403. The light collected by the lens 201 passes through the shutter 401 and reaches the imaging surface of the element unit 402. The element unit 402 includes a two-dimensional pixel array, and a pixel signal corresponding to the amount of received light is output from each pixel. Each pixel signal is amplified in the analog region by the analog gain processing unit 403, and then digitally converted and output to the signal processing unit 203.

Note that, the image sensor 202 will be described below as performing a single exposure (that is, having a single exposure timing within one frame period).

The signal processing unit 203 includes a development processing unit 404, a detection unit 405, and a comparison unit 406. However, the detection unit 405 includes a vehicle detection unit 405-1 that detects the brightness of the vehicle portion in the captured image, and a road surface detection unit 405-2 that detects the brightness of the road surface in the captured image so that the recognition unit 204 can perform OPD detection for each object recognized from the captured image. Furthermore, the detection unit 405 also includes an entire screen detection unit 405-3 that performs OPD detection of the entire screen imaged by the image sensor 202. Furthermore, in a case where the recognition unit 204 additionally detects an object other than the vehicle and the road surface, a detection unit that detects the brightness of the added object may further be provided.

Furthermore, the development processing unit 404 includes a vehicle development processing unit 404-1 and a road surface development processing unit 404-2 so that the recognition unit 204 can individually perform the development processing suitable for each object recognized from the captured image. Furthermore, the development processing unit also includes an entire screen development processing unit 404-3 that performs development processing suitable for the entire screen. Furthermore, in a case where the recognition unit 204 additionally detects an object other than the vehicle and the road surface, a development processing unit for the added object may further be provided.

In FIG. 4, normal automatic exposure control is performed within the range indicated by reference numeral 410. That is, the entire screen detection unit 405-3 detects the brightness of the screen by the OPD detection of the entire screen imaged by the image sensor 202. Then, the comparison unit 306 compares the brightness of the entire screen detected by the detection unit 305 with a predetermined reference value (Ref). The control unit 205 controls the opening and closing timing (that is, the exposure time) of the shutter 401, adjusts the analog gain of the analog gain processing unit 403, and adjusts the digital gain in the development processing unit 404-3 and other developing parameters on the basis of the difference between the screen brightness and the reference value output from the comparison unit 406 to control the captured image of the image sensor 202 to have an appropriate brightness.

On the other hand, the recognition unit 204 recognizes an object included in the captured image 420 after being processed by the signal processing unit 403. Here, assuming that the imaging apparatus 200 is used as an in-vehicle camera (or a data acquisition unit 102 in the vehicle control system 100), the recognition unit 204 recognizes a vehicle 421 and a road surface 422 as objects that must be recognized or detected for realization of automatic driving and ADAS. Of course, other objects such as motorcycles, bicycles, pedestrians, road signs, traffic lights, guardrails, roadside trees and street lights can further be included into the recognition target.

On the basis of the recognition result of the vehicle 421 by the recognition unit 204, the vehicle detection unit 405-1 sets the detection frame of the vehicle 421 in the captured image 420, detects the brightness in the detection frame, and calculates the difference between the brightness of the entire screen detected by the entire screen detection unit 405-3 and the brightness within the detection frame of the vehicle 421. Then, in the vehicle development processing unit 404-1, the digital gain and the gamma value are adjusted on the basis of the difference, and the brightness within the frame of the vehicle 421 is adjusted. That is, the vehicle development processing unit 404-1 performs the development processing that is optimal for recognizing the vehicle 421 from the captured image (if the detection frame of the vehicle 421 is too dark for the entire screen, the vehicle development processing unit 404-1 performs development processing so that the vehicle 421 becomes brighter, and if the detection frame of the vehicle 421 is too bright for the entire screen, vehicle development processing unit 404-1 performs development processing so that the vehicle 421 becomes dark). The captured image developed by the vehicle development processing unit 404-1 does not necessarily faithfully reproduce the original landscape, and causes uncomfortable feeling for a person when viewing or appreciating in some cases, but is an image in which the vehicle 421 can be recognized with high accuracy.

Furthermore, on the basis of the recognition result of the road surface 422 by the recognition unit 204, the road surface detection unit 405-2 sets the detection frame of the road surface 422 in the captured image 420, detects the brightness in the detection frame, and calculates the difference between the brightness of the entire screen detected by the entire screen detection unit 405-3 and the brightness within the detection frame of the road surface 422. Then, in the road surface development processing unit 404-2, the digital gain and the gamma value are adjusted on the basis of the difference to adjust the brightness in the frame of the road surface 422 (if the detection frame of the road surface 422 is too dark for the entire screen, the road surface development processing unit 404-2 performs development processing so that the road surface 422 becomes brighter, and if the detection frame of the road surface 422 is too bright for the entire screen, road surface development processing unit 404-2 performs development processing so that the road surface 421 becomes dark). That is, the road surface development processing unit 404-2 performs the development processing that is optimal for recognizing the road surface 422 as an object from the captured image. The captured image developed by the road surface development processing unit 404-2 does not necessarily faithfully reproduce the original landscape, and causes uncomfortable feeling for a person when viewing or appreciating in some cases, but is an image in which the road surface 422 can be recognized with high accuracy.

The imaging apparatus 200 shown in FIG. 4 includes the recognition unit 204, and is equipped with a plurality of development processing units and detection units for each object recognized by the recognition unit 204 so that the imaging apparatus 200 can perform stably normal automatic exposure control, and at the same time, can perform optimum development for image recognition of each object.

Image recognition of vehicles and road surfaces is of utmost importance for realization of automatic driving and ADAS. From this point of view, the imaging apparatus 200 shown in FIG. 4 has a configuration in which the recognition unit 204 recognizes two types of objects, the vehicle and the road surface, and is equipped with a plurality of detection units and development processing units for the vehicle and the road surface. Of course, the recognition unit 204 can further include other objects such as motorcycles, bicycles, pedestrians, road signs, traffic lights, lanes, medians, guardrails, roadside trees and street lights into the recognition target, and correspondingly, by adding a plurality of detection units and development processing units for each of the added recognition objects, it is possible to perform optimum development for image recognition of various types of objects.

Furthermore, in the above description, the image sensor 202 has been described as performing a single exposure, but of course, may be able to perform multiple simultaneous exposures (that is, having a plurality of exposure timings within a frame period and capturing a plurality of images within a frame period). The imaging apparatus 200 utilizes multiple simultaneous exposures to output images depending on usage such as for automatic exposure control for each luminance group such as low-luminance side automatic exposure and high-luminance side automatic exposure, and for light emitting diode (LED) flicker countermeasures.

Figure 5:
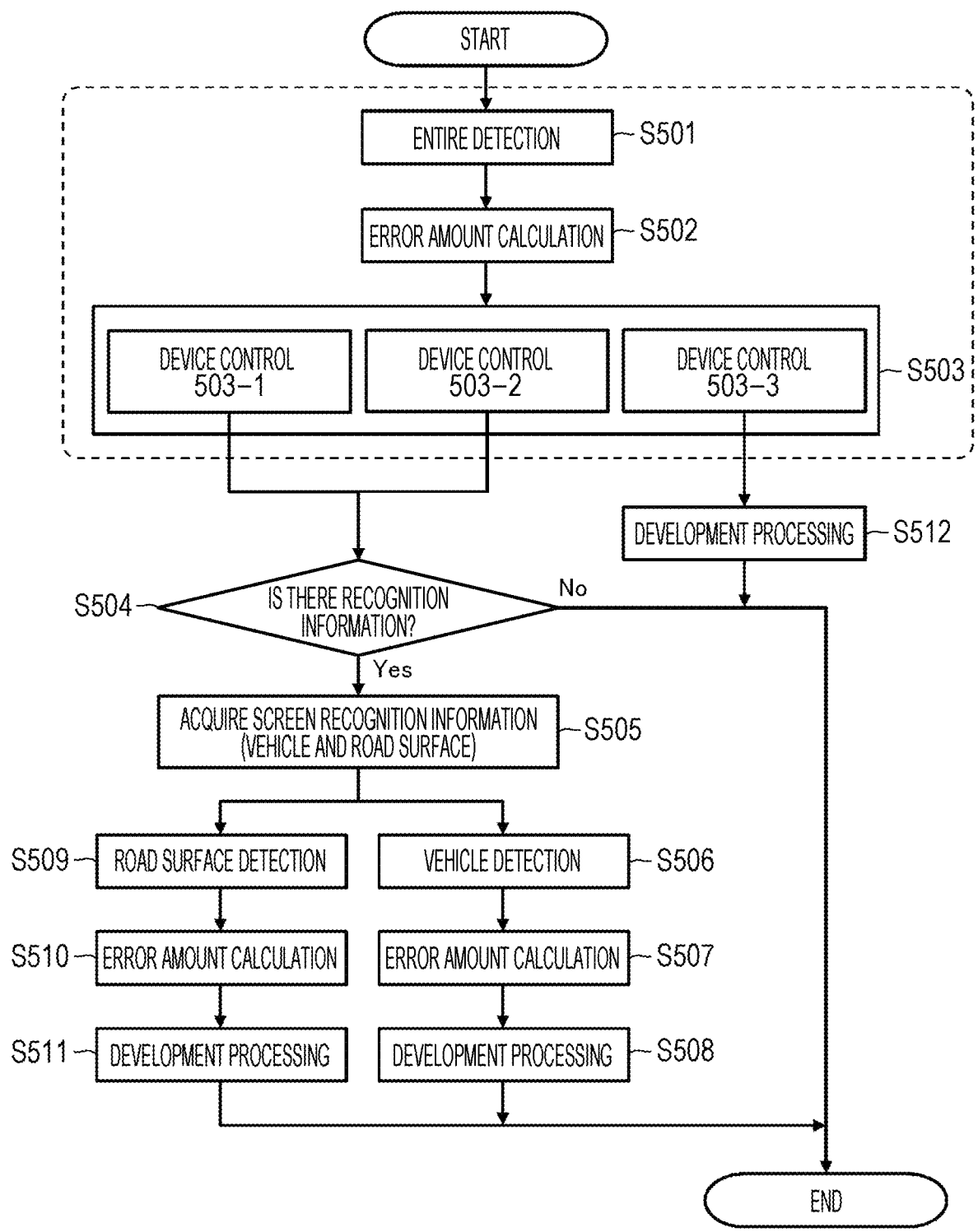
FIG. 5 is a flowchart showing a basic operation procedure of the imaging apparatus 200.

FIG. 5 shows a basic operation procedure for automatic exposure control in the imaging apparatus 200 shown in FIG. 4 in the form of a flowchart. However, here, it is assumed that the image sensor 202 can perform multiple simultaneous exposure, and performs three-time exposure for the vehicle, the road surface, and the entire screen.

The entire screen detection unit 405-3 detects the brightness of the entire screen of the image captured by the image sensor 202 (step S501).

Next, the comparison unit 406 compares the brightness of the entire screen detected by the entire screen detection unit 405-3 with a predetermined reference value (Ref), and calculates the error amount (step S502).

Then, the control unit 205 performs device control such as opening and closing timing (that is, exposure time) of the shutter 401 and analog gain adjustment of the analog gain processing unit 403 on the basis of the error amount calculated in step S502 (step S503).

Here, it is assumed that the image sensor 202 performs multiple simultaneous exposure. Therefore, in step S503, each device control (steps S503-1, S503-2, S503-3) may be performed for low luminance, high luminance, and the entire screen. Furthermore, each device control may have the similar contents.

Note that the processing performed in steps S501 to S503 is processing corresponding to normal automatic exposure control.

The recognition unit 204 performs image recognition processing on each captured image processed on the basis of the device control of steps S503-1 and S503-2 (step S504).

In a case where the recognition unit 204 cannot recognize the target object (vehicle, road surface) from the captured image (No in step S504), this processing ends.

On the other hand, in a case where the recognition unit 204 can recognize the target object (vehicle, road surface) from the captured image (Yes in step S504), the signal processing unit 203 acquires image recognition information related to the target object (vehicle, road surface) from the recognition unit 204 (step S505).

The vehicle detection unit 405-1 sets a vehicle detection frame on the basis of the image recognition information acquired from the recognition unit 204 to detect the brightness of the vehicle detection frame (step S506). Here, in a case where the recognition unit 204 can recognize N vehicles (where N is an integer of 2 or more) from the captured image, the vehicle detection unit 405-1 may set the detection frame for N vehicles to detect the brightness of all vehicles individually, may detect the average brightness of all detection frames, or may detect the brightness of up to a predetermined number of units with higher priority. The priority of the vehicle may be assigned on the basis of the possibility of collision with the own vehicle such as the distance from the own vehicle.

Next, the vehicle detection unit 405-1 compares the brightness of the vehicle detection frame with the brightness of the entire screen detected by the entire screen detection unit 405-3 to calculate the error amount (step S507). Then, the vehicle development processing unit 404-1 performs development processing on an image captured for the vehicle by multiple simultaneous exposure, on the basis of the error amount calculated in step S507 (step S508).

Furthermore, the road surface detection unit 405-2 sets a road surface detection frame on the basis of the image recognition information acquired from the recognition unit 204 to detect the brightness of the vehicle detection frame (step S509). Next, the road surface detection unit 405-2 compares the brightness of the vehicle detection frame with the brightness of the entire screen detected by the entire screen detection unit 405-3 to calculate the error amount (step S510). Then, the road surface development processing unit 404-2 performs development processing on an image captured for the road surface by multiple simultaneous exposure, on the basis of the error amount calculated in step S510 (step S511).

On the other hand, the development processing unit 404-3 performs development processing for measures against LED flicker (step S512).

Finally, the first embodiment will be summarized. As shown in FIG. 4, the imaging apparatus 200 is equipped with a multiple simultaneous exposure function, a multiple detection function, and a multiple development function. With such a configuration, the imaging apparatus 200 can maintain stable exposure even with a sudden change in the subject while suppressing LED flicker. As a result, the imaging apparatus 200 is characterized in that it is possible to perform optimum development processing on a plurality of subjects without depending on each other's exposure, and it is possible to immediately reflect the amount of error during development. Furthermore, the imaging apparatus 200 is characterized in that the subject detection function can be maintained.

Second Embodiment

In order to improve the accuracy of image recognition, it is necessary to perform imaging under an exposure condition that makes it easy to recognize the object to be recognized. However, in a backlit or darkness state, unrecognizable scenes are imaged. For example, when driving under the roadside trees under the scorching sun with strong sunlight, the contrast between the sunlit part and the shaded part is too strong, and the automatic exposure control cannot keep up with the change in brightness. With normal camera control, it takes too long to reach the proper exposure conditions, and it cannot be tracked. As a result, overexposure or underexposure continues for a long time, and during this period, the state in which image recognition cannot be performed continues, so that the automatic driving by the vehicle control system 100 and ADAS do not function sufficiently. Other examples of the state in which image recognition cannot be performed include the entrance and exit of a tunnel and the state of being exposed to the headlights of an oncoming vehicle.

Therefore, in a second embodiment, an imaging apparatus that determines a problem scene in which image recognition of surrounding vehicles cannot be performed on the basis of the image recognition result and adaptively controls automatic exposure in such a problem scene will be described.

Here, as a problem scene in which image recognition cannot be performed, as described above, a backlit state strong sunlight, a tunnel entrance and exit, and a state of being exposed to the headlights of an oncoming vehicle can be mentioned. Such a problem scene can be determined on the basis of the calculation result of the vanishing point and the degree of contrast in the captured image. Furthermore, as adaptive control of automatic exposure in a problem scene, variable control of the convergence speed of automatic exposure and variable control of an automatic exposure detection region can be mentioned. Details of the problem scene determination method and the adaptive control of automatic exposure will be described later.

Figure 6:
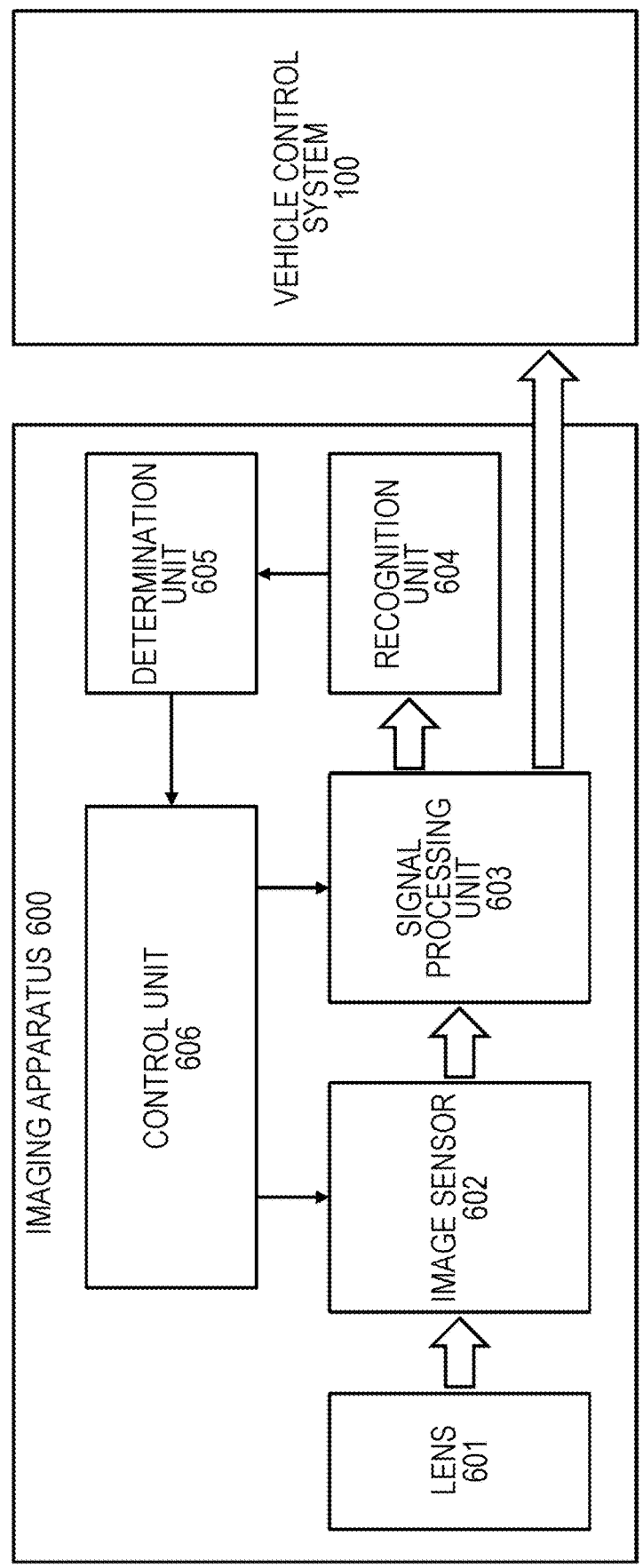
FIG. 6 is a diagram schematically showing a functional configuration example of an imaging apparatus 600 according to a second embodiment.

FIG. 6 schematically shows a functional configuration example of an imaging apparatus 600 according to the second embodiment. It is assumed that the imaging apparatus 600 is mainly used by being mounted on a vehicle. The illustrated imaging apparatus 600 includes a lens 601, an image sensor 602, a signal processing unit 603, a recognition unit 604, a determination unit 605, and a control unit 605.

The image sensor 602 is configured by using elements such as CMOS and CCD, for example, and captures an image formed on the imaging surface by the lens 601. The signal processing unit 603 performs development processing on RAW data output from the image sensor 602. For example, demosaic, noise reduction, white balance adjustment, gamma correction, sensor spectroscopic correction, YC conversion, and the like correspond to the development processing.

The recognition unit 604 recognizes an object included in the captured image after being processed by the signal processing unit 603. In the present embodiment, the recognition unit 604 basically recognizes surrounding vehicles and diagonal lines (lanes) as objects used for determining the problem scene by the determination unit 605 in the subsequent stage. Of course, the recognition unit 604 can further include, into the recognition target, other objects such as motorcycles, bicycles, pedestrians, road signs, traffic lights, guardrails, roadside trees and street lights.

The determination unit 605 determines a problem scene in which image recognition of surrounding vehicles cannot be performed on the basis of the image recognition result in the recognition unit 604. Specifically, the determination unit 605 determines a backlit state with strong sunlight, a tunnel entrance and exit, and a state of being exposed to the headlights of an oncoming vehicle. The determination unit 605 calculates the vanishing point on the basis of the image recognition result by the recognition unit 604, calculates the contrast degree of the captured image, and determines the scene on the basis of these calculation results.

The vanishing point is the point at which, in a case where a plurality of parallel lines in three-dimensional space is projected onto the image by perspective transformation, the straight lines on the image that correspond to the parallel lines converge, and theoretically, is a point at infinity. There are various methods for calculating the vanishing point. In the present embodiment, the determination unit 605 calculates the vanishing point on the basis of the lane detection result by the recognition unit 604 and the position and size of the image-recognized area.

Furthermore, the determination unit 605 calculates the degree of contrast of the image on the basis of the OPD detection. In the present embodiment, the determination unit 605 calculates the degree of contrast by two methods of a method of comparing the detection value of the road surface region in the captured image with the detection value of the other region, and a method of determining on the basis of the shape of the histogram (luminance distribution of the image).

The control unit 606 controls the imaging operation of the image sensor 602 and the development processing of the signal processing unit 603 to adaptively control automatic exposure in a problem scene in which the determination unit 605 determines that image recognition of surrounding vehicles cannot be performed. Specifically, the control unit 606 performs, as adaptive control of automatic exposure in a problem scene, variable control of the convergence speed of automatic exposure and variable control of an automatic exposure detection region.

In the vehicle control system 100 at the subsequent stage, by recognizing the image captured by the image sensor 602 and developed by the signal processing unit 603 under the control of the control unit 606, the surrounding vehicles can be recognized with high accuracy or high recognition rate. Then, on the basis of such image recognition result, the vehicle control system 100 performs vehicle control for automatic driving or ADAS such as, for example, inter-vehicle control (ACC), lane departure warning (LDW), lane keep assist (LKA), automatic emergency braking (AEB), and blind spot detection (BSD), and also controls the drive of each drive unit such as active cornering light (ACL), brake actuator (BRK), and steering device (STR). This can contribute to the safe driving of the own vehicle.

The imaging apparatus 600 according to the second embodiment is different from the first embodiment (that is, the imaging apparatus 200 shown in FIG. 4), the image sensor 606 may be a single exposure, the signal processing unit 603 and the detection unit 604 may be one system, and the system for each object is unnecessary. That is, the imaging apparatus 600 may have an apparatus configuration as shown in FIG. 3.

Figure 7:
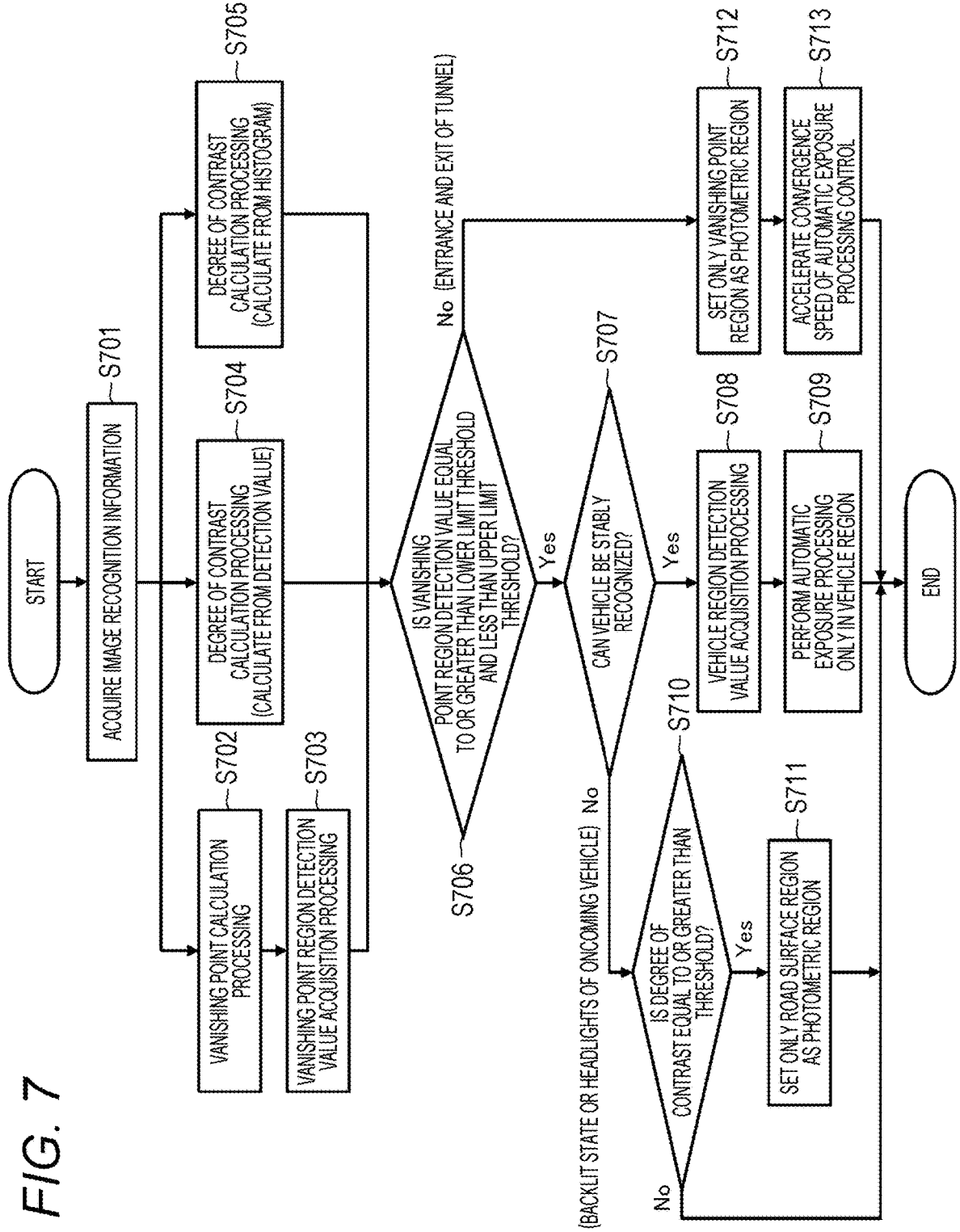
FIG. 7 is a flowchart showing a basic operation procedure of the imaging apparatus 600.

FIG. 7 shows a basic operation procedure for automatic exposure control in the imaging apparatus 600 shown in FIG. 6 in the form of a flowchart.

The determination unit 605 acquires image recognition information by the recognition unit 604 (step S701). The recognition unit 604 can recognize an object such as a road surface, a lane on the road surface, or a vehicle from the captured image by the image sensor 602. Then, the detection frame can be arranged on the ground (road surface), the sky, the vehicle, the vanishing point, or the like with respect to the captured image on the basis of the image recognition result by the recognition unit 604.

The determination unit 605 calculates the vanishing point on the basis of the image recognition information by the recognition unit 604 (step S702), and further acquires the detection value of the vanishing point region (step S703).

Furthermore, the determination unit 605 calculates the degree of contrast of the image on the basis of the OPD detection. Specifically, the determination unit 605 calculates the degree of contrast by comparing the detection value of the road surface region in the captured image with the detection value of the other region (step S704), and calculates the degree of contrast on the basis of the shape of the histogram (luminance distribution of the image) (step S705).

Next, the determination unit 605 checks whether or not the detection value of the vanishing point region acquired in step S703 is equal to or greater than a lower limit threshold $TH_{low}$ and less than the upper limit threshold $TH_{High}$ (step S706).

In a case where the detection value in the vanishing point region is equal to or greater than the lower limit threshold $TH_{low}$ and less than the upper limit threshold $TH_{High}$ (Yes in step S706), the determination unit 605 further checks whether or not the recognition unit 604 can stably recognize the vehicle (step S707). Here, "stable" recognition means that, for example, the likelihood of recognition is high, and the recognition result does not change suddenly and is stable.

In a case where the recognition unit 604 can stably recognize the vehicle (Yes in step S707), the control unit 606 acquires the detection value of the vehicle region in the captured image (step S708) and performs the automatic exposure control of the image sensor 602 and control of the development processing in the signal processing unit 603 using only the detection value of the vehicle region (step S709).

On the other hand, in a case where the recognition unit 604 cannot stably recognize the vehicle (No in step S707), the determination unit 605 further checks whether or not the degree of contrast calculated in steps S704 and S705 is equal to or greater than a predetermined threshold $TH_c$ (step S710).

Then, in a case where the degree of contrast of the captured image is equal to or greater than the predetermined threshold $TH_c$ (Yes in step S710), OPD detection is performed with the detection region set to only the road surface region, and the control unit 606 performs the automatic exposure control of the image sensor 602 and the development processing in the signal processing unit 603 on the basis of the detection result of the road surface region (step S711). Alternatively, OPD detection may be performed by making the weight of the road surface region larger than that of the other regions.

Furthermore, in a case where the degree of contrast of the captured image is equal to or greater than the predetermined threshold $TH_c$ (Yes in step S710), it is estimated that the vehicle is in a backlit state with strong sunlight or is exposed to the headlights of an oncoming vehicle, and therefore, automatic exposure control is performed by setting the photometric region to only the road surface region. On the other hand, in a case where the degree of contrast of the captured image is less than the predetermined threshold $TH_c$ (No in step S710), it is estimated that the vehicle is not in a backlit state and is only in a state where there is no vehicle in front of the image, and therefore, this processing ends without the automatic exposure control being performed.

Furthermore, in a case where the detection value in the vanishing point region is less than the lower limit threshold $TH_{low}$ or exceeds the upper limit threshold $TH_{High}$ (No in step S706), it is estimated that the own vehicle has reached either the vicinity of the exit or the vicinity of the entrance of the tunnel. Therefore, OPD detection is performed by setting the detection frame only in the vanishing point region (corresponding to the entrance/exit of the tunnel), and the control unit 606 performs automatic exposure control of the image sensor 602 and control of the development processing in the signal processing unit 603 on the basis of the detection result in the vanishing point region (step S712). Furthermore, in order to avoid a situation where it takes too much time to reach an appropriate exposure condition and it becomes impossible to follow, the control unit 606 accelerates the convergence speed of the automatic exposure control (step S713).

Figure 8:
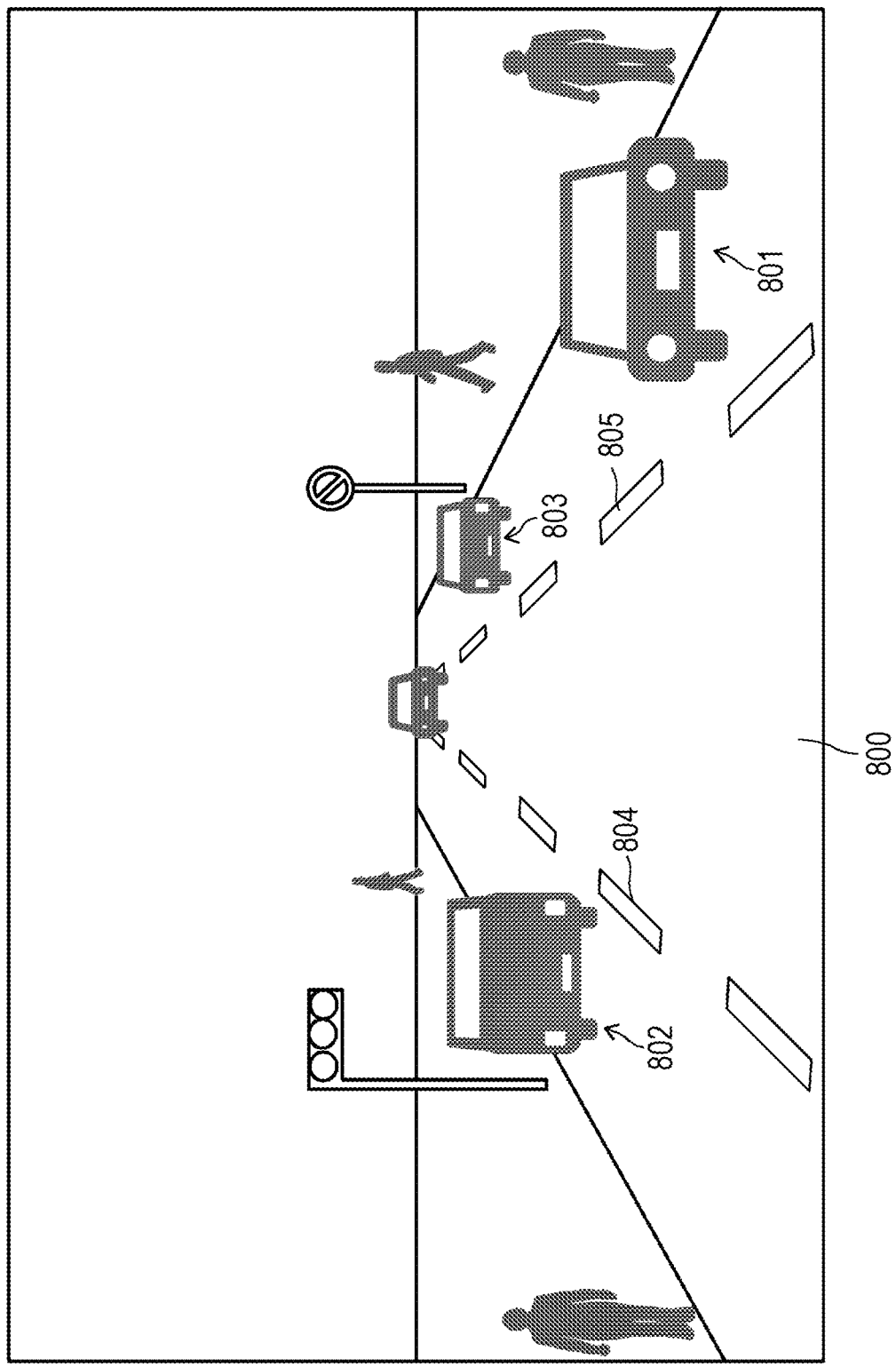
FIG. 8 is a diagram illustrating a landscape imaged by the imaging apparatus 600.

Subsequently, the operation procedure shown in FIG. 7 will be specifically described by taking as an example the case where the landscape as shown in FIG. 8 is imaged by the imaging apparatus 600.

Figure 9:
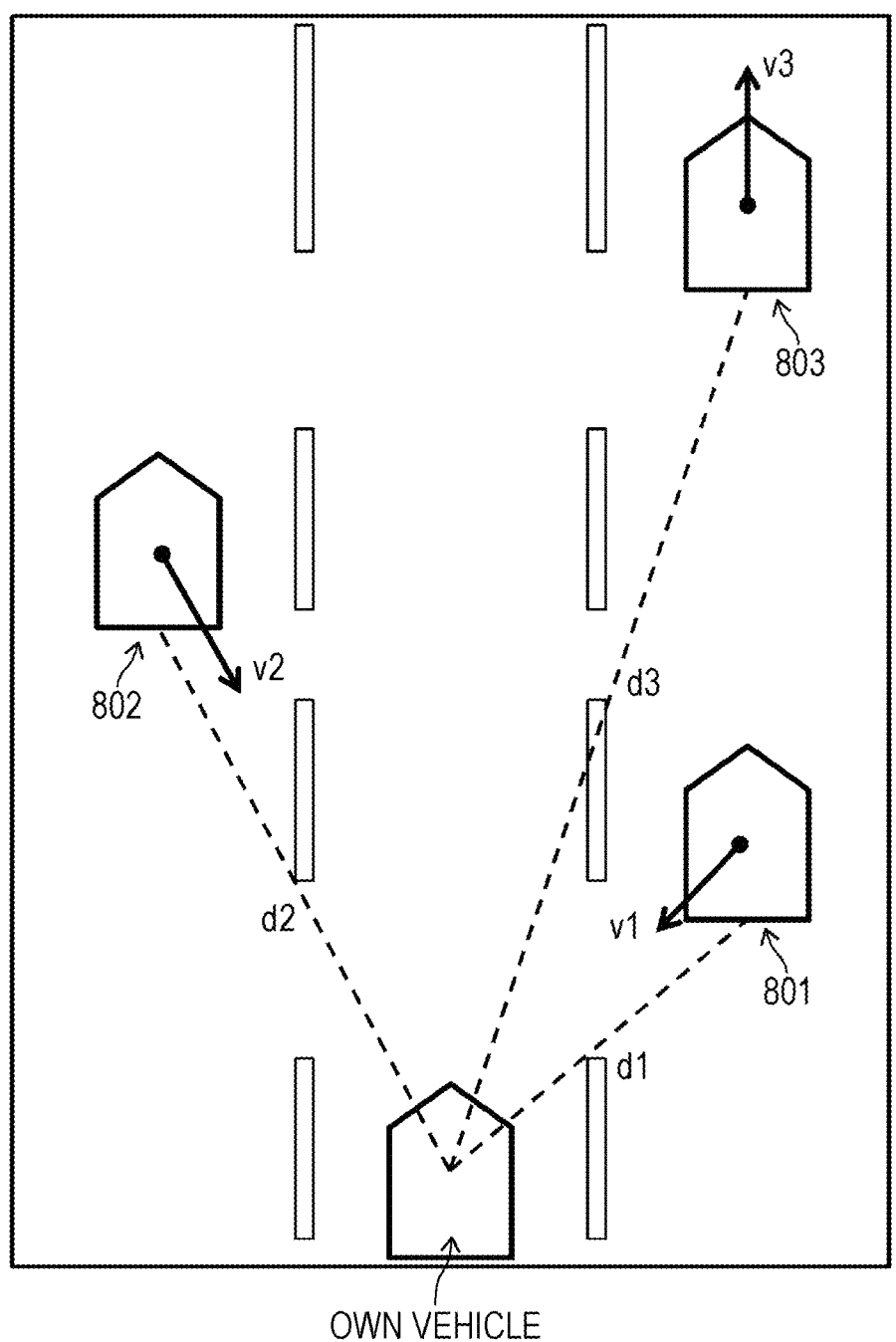
FIG. 9 is a view showing a bird's-eye view of the landscape shown in FIG. 8.

Regarding Arrangement of Detection Frame:

FIG. 8 shows a situation where the front of the vehicle is imaged with the in-vehicle imaging apparatus 600 while the own vehicle is traveling on a road with three lanes on each side. In the example shown in FIG. 8, preceding vehicles 801, 802, and 803 are traveling on the road surface 800 in front of the own vehicle in the order of the closest distance from the own vehicle. Furthermore, FIG. 9 shows a bird's-eye view of the front of the own vehicle. The distances from the own vehicle to the preceding vehicles 801, 802, and 803 are d1, d2, and d3, respectively. Furthermore, the relative speeds and directions of the preceding vehicles 801, 802, and 803 are v1, v2, and v3, respectively. The distances and relative speeds of the preceding vehicles 801, 802, and 803 can be measured, for example, using a radar equipped in the vehicle control system 100 as the data acquisition unit 102.

Figure 10:
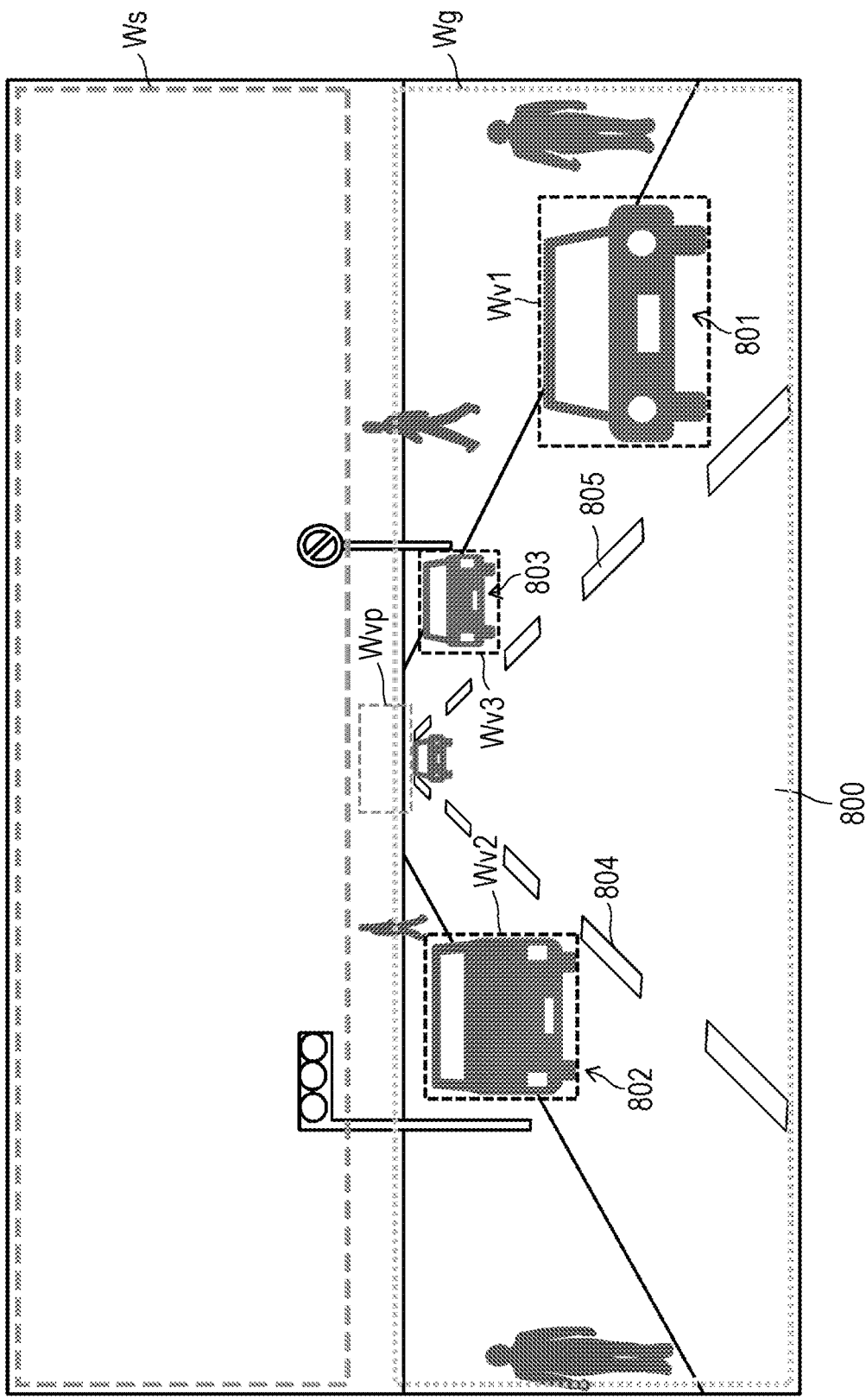
FIG. 10 is a diagram showing a state in which a detection frame is arranged in a captured image shown in FIG. 8.

The recognition unit 604 recognizes an object such as a road surface (ground) 800, preceding vehicles 801 to 803, and lanes 804, 805 by performing image recognition processing on the captured image shown in FIG. 8. Then, the determination unit 605 can arrange the detection frames for each of the road surface 800, the sky, the vanishing point, and the preceding vehicles 801 to 803, as shown in FIG. 10, on the basis of the image recognition information by the recognition unit 604.

Road surface, sky (Wg, Ws)
Vanishing point (Wvp)
Preceding vehicle (Wv1, Wv2, Wv3)

Of course, in addition to the above, the recognition unit 604 can also recognize objects such as motorcycles, bicycles, pedestrians, road signs, and traffic lights as needed. Furthermore, the determination unit 605 can similarly arrange the detection frame for these recognized objects.

The control unit 606 controls distance d1, d2, d3 and the relative speeds v1, v2, v3 to the preceding vehicles 801, 802, 803, and weighting of the preceding vehicles 801, 802, 803 on the basis of the entire frame including the road surface detection frame Wg and the sky detection frame Ws. For example, the weight of a vehicle that is close to the own vehicle or a vehicle that is approaching the own vehicle at a high speed is increased.

Figure 11:
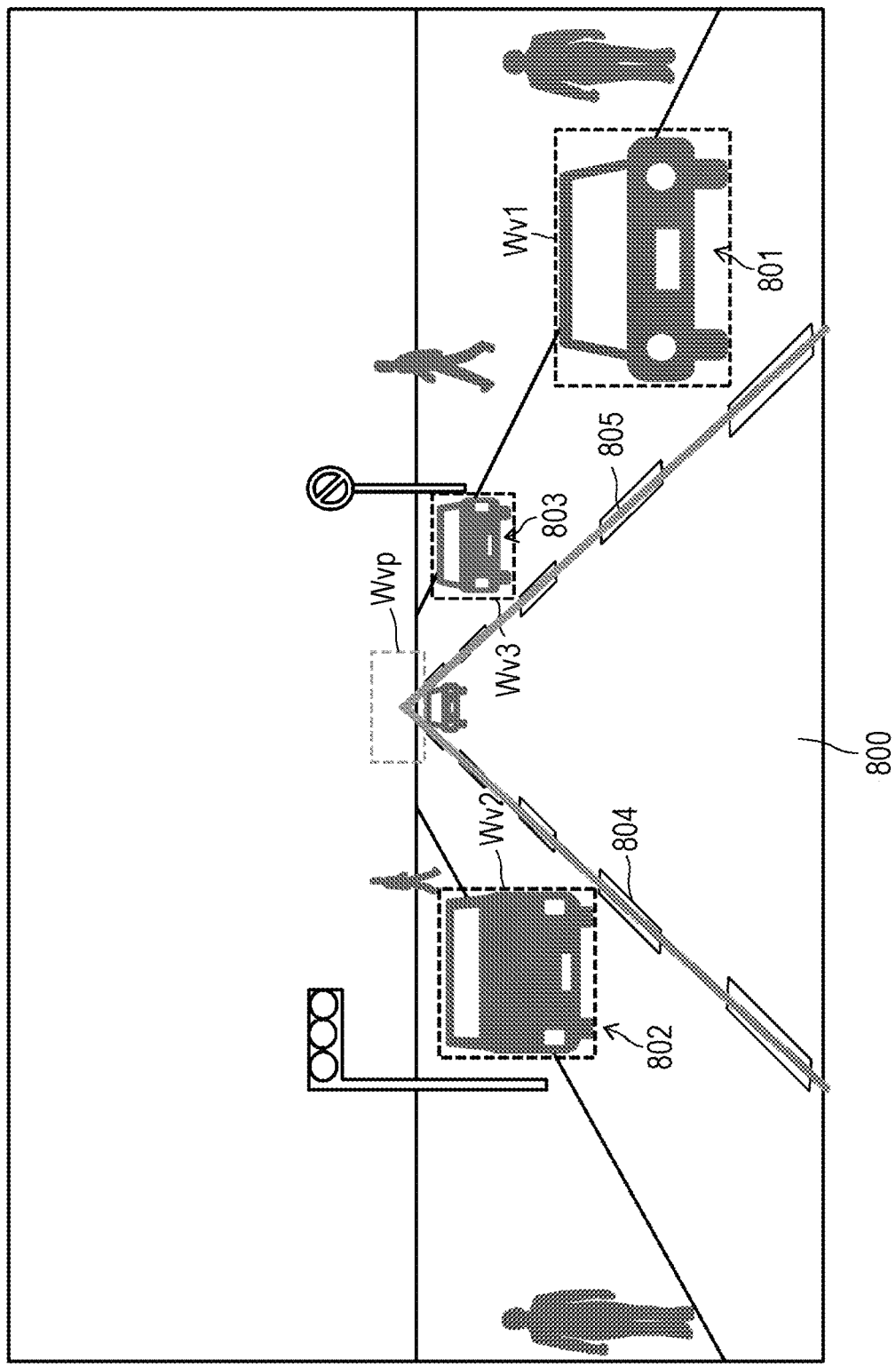
FIG. 11 is a diagram for explaining a method of calculating a vanishing point and a vanishing point detection frame.

Regarding Calculation of Vanishing Point:

The determination unit 605 calculates the vanishing point on the basis of the image recognition information by the recognition unit 604 in step S702 in the flowchart shown in FIG. 7, and calculates the vanishing point detection frame in the subsequent step S703. FIG. 11 shows a situation where the vanishing point is calculated. Lanes can be mentioned as parallel lines in a three-dimensional space as the target. Therefore, the determination unit 605 determines the intersection of the lane 804 and the lane 805 at the center position of the vanishing point detection frame. Then, a vanishing point detection frame Wvp is calculated on the basis of the position and size of each of the vehicles 801 to 803.

Figure 12:
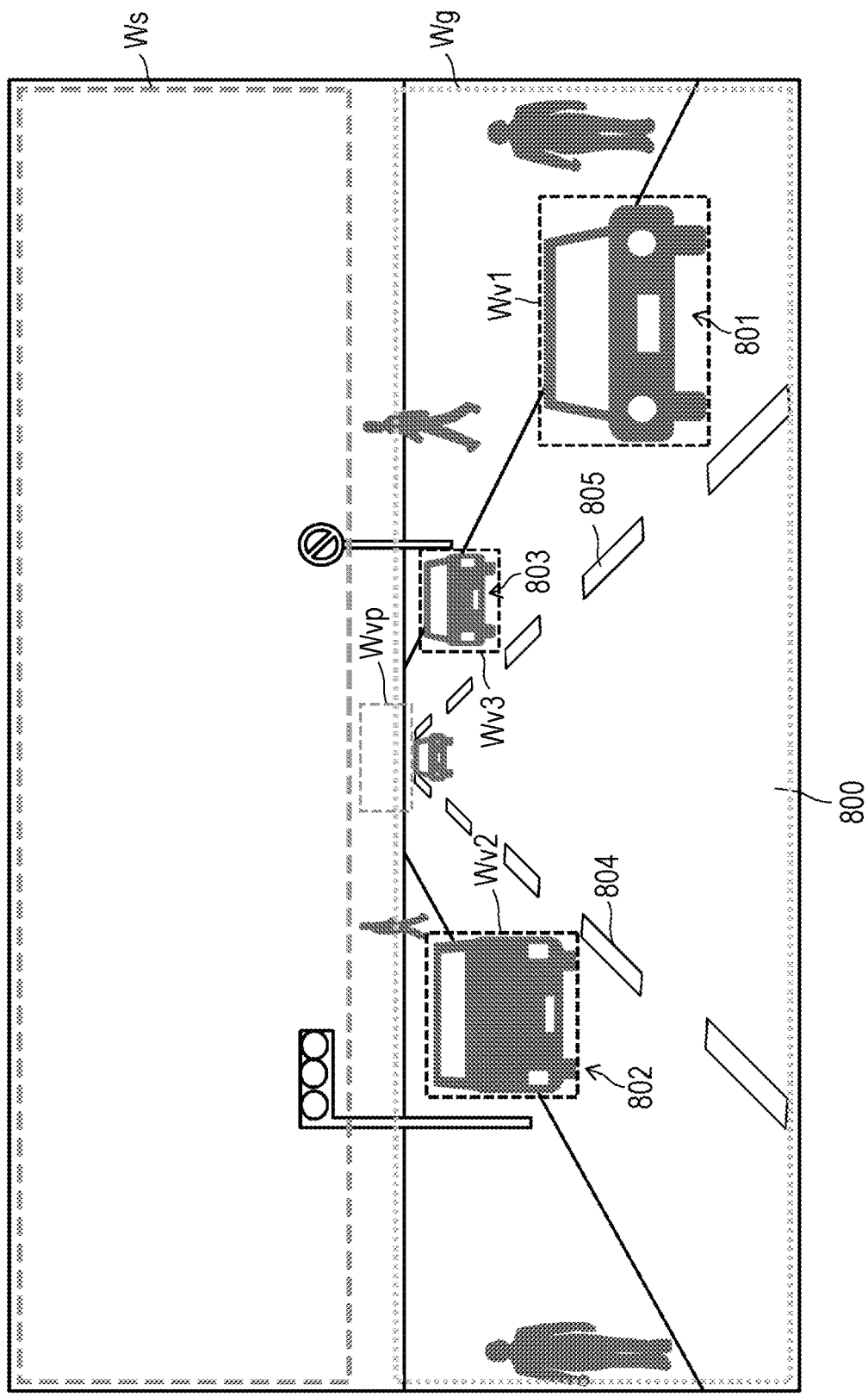
FIG. 12 is a diagram for explaining a method of calculating the contrast degree of an image on the basis of a detection value.

Calculation Method of Degree of Contrast 1:

In step S704 in the flowchart shown in FIG. 7, the determination unit 605 calculates the degree of contrast by comparing the detection value of the road surface region in the captured image with the detection value of the other region. FIG. 12 shows the situation where the degree of contrast is calculated. The determination unit 605 can obtain the road surface detection frame Wg from the information of the preceding vehicles 801 to 803 and the lanes 804 and 805 image-recognized by the recognition unit 604, and can assume that the other parts are sky detection frames Ws. Then, the determination unit 605 calculates the absolute value ABS (Wg-Ws) of the difference between the detection value of the road surface detection frame Wg and the detection value of the sky detection frame Ws as the degree of contrast. Thereafter, in step S710, the determination unit 605 can determine that the contrast of the captured image is strong if the absolute value ABS (Wg-Ws) of the difference calculated as the degree of contrast is larger than a predetermined threshold.

Figure 13:
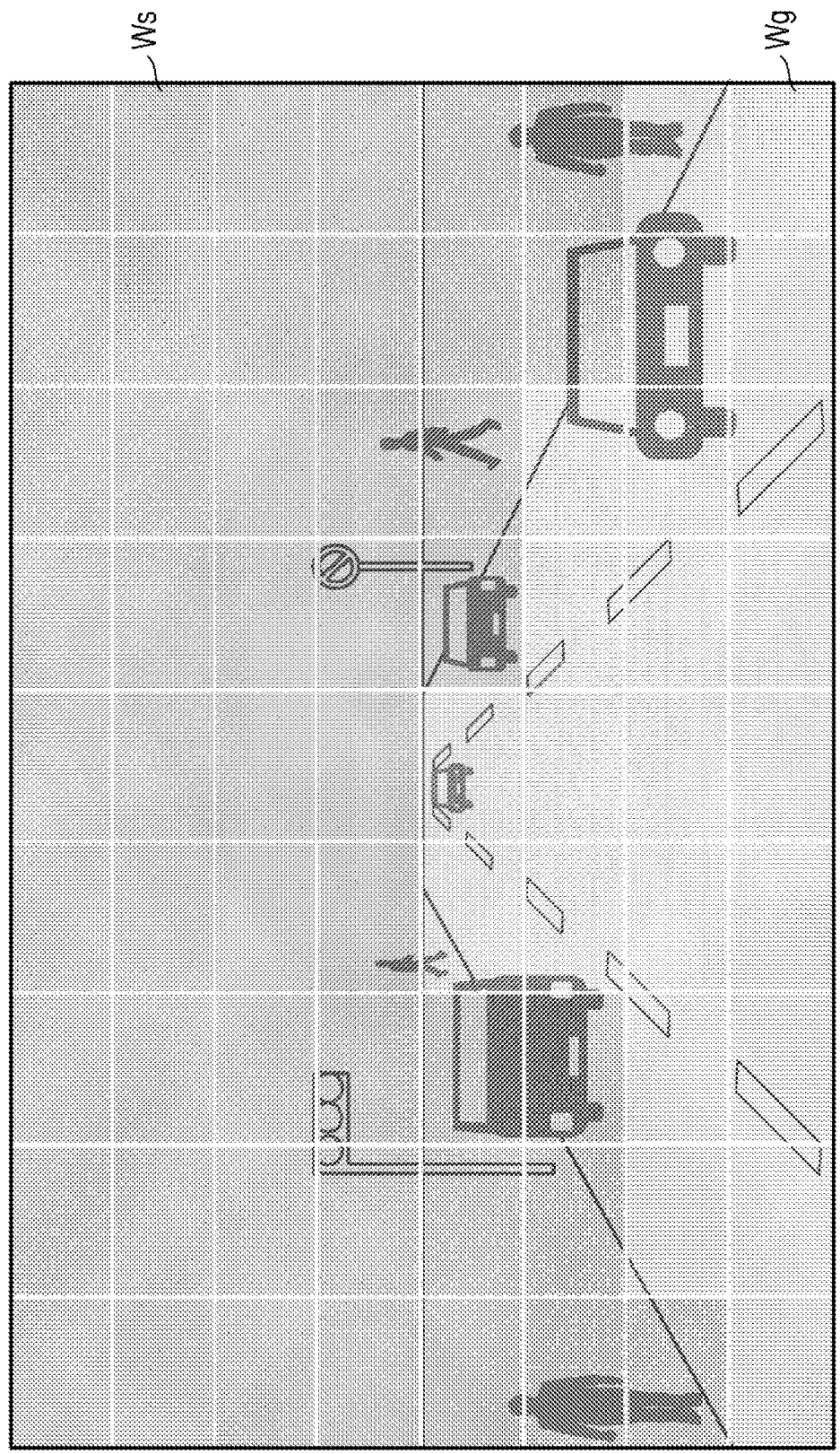
FIG. 13 is a diagram for explaining a method of calculating the contrast degree of the image on the basis of the detection value (in a case where a multi-frame function is assumed).

FIG. 13 shows the situation where the degree of contrast is calculated in a case of assuming the multi-frame function. The determination unit 605 obtains the road surface detection frame Wg from the information of the preceding vehicles 801 to 803 and the lanes 804 and 805 image-recognized by the recognition unit 604, and assumes that the other parts are sky detection frames Ws. In FIG. 13, the road surface detection music Wg is painted in light gray, and the other sky detection frames Ws are painted in dark gray. Then, the determination unit 605 calculates the absolute value ABS (Wg-Ws) of the difference between the detection value of the road surface detection frame Wg and the detection value of the sky detection frame Ws as the degree of contrast. Thereafter, in step S710, the determination unit 605 determines that the contrast of the captured image is strong if the absolute value ABS (Wg-Ws) of the difference calculated as the degree of contrast is larger than a predetermined threshold.

Calculation Method of Degree of Contrast 2:

The determination unit 605 calculates the degree of contrast on the basis of the shape of the histogram (luminance distribution of the image) in step S705 in the flowchart shown in FIG. 7. The determination unit 605 calculates the degree of separation of the histogram by using the determination analysis method, which is one of binarization methods, and can determine that the degree of contrast of the image is strong if the degree of separation is high.

Figure 14:
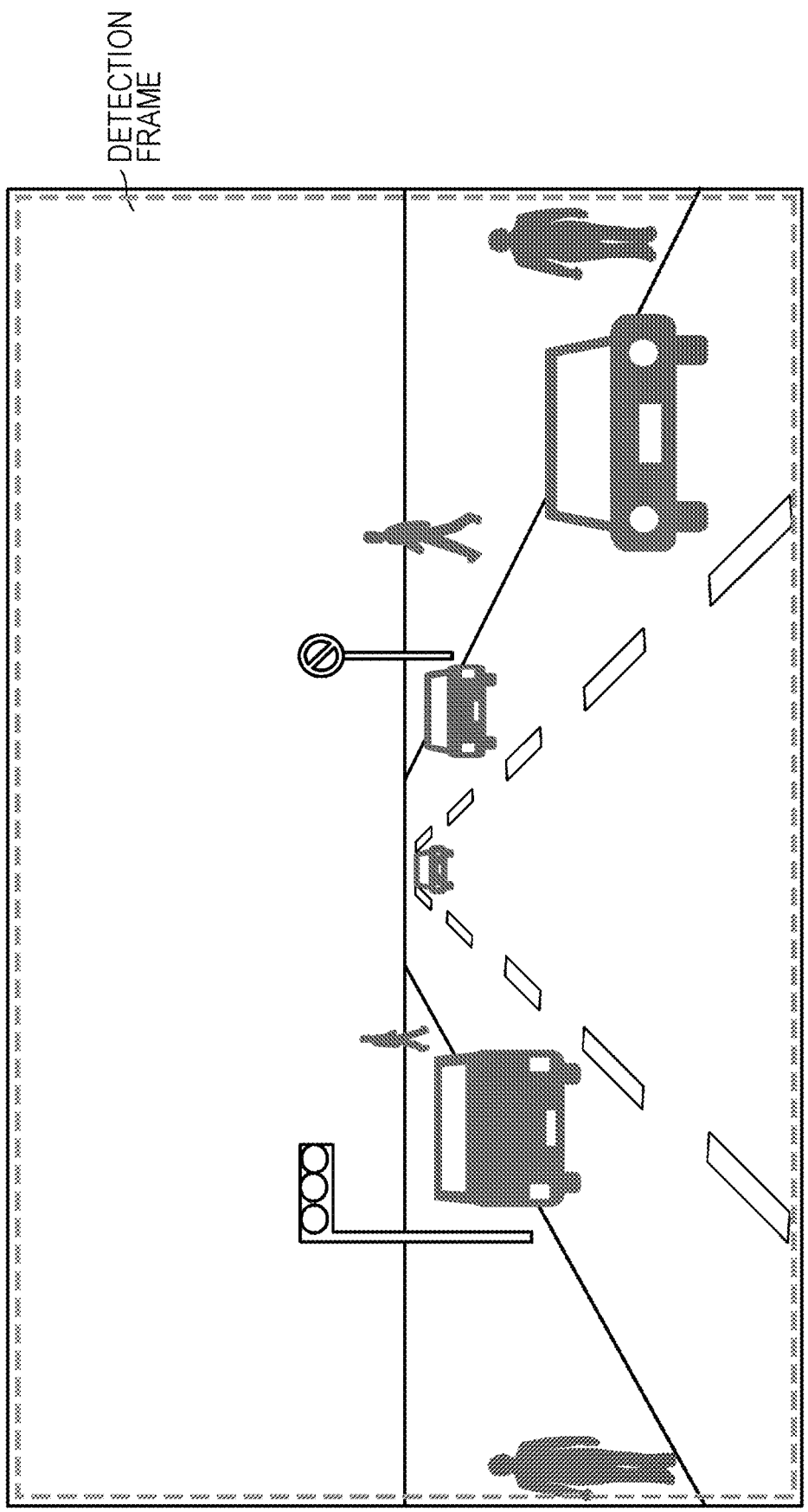
FIG. 14 is a diagram showing a state in which a detection frame is arranged over the entire image.
Figure 15:
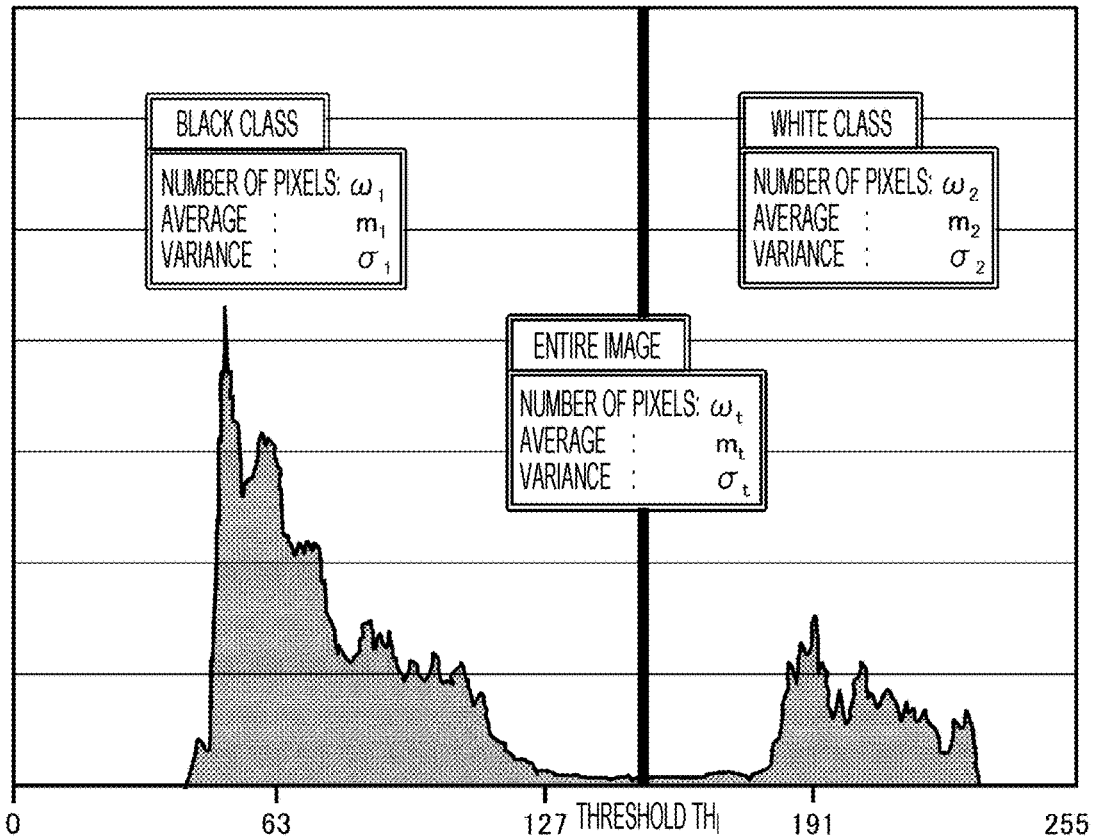
FIG. 15 is a diagram illustrating a histogram acquired by arranging the detection frame over the entire image shown in FIG. 14.

For example, as shown in FIG. 14, a detection frame is arranged over the entire image to acquire a histogram. FIG. 15 illustrates a histogram acquired by arranging a detection frame over the entire image shown in FIG. 14. In the example shown in FIG. 15, the luminance level of the image includes 256 gradations from 0 to 255, and the pixel number distribution for each luminance level is acquired.

Here, it is assumed that the number of pixels of the entire image shown in FIG. 14 is $\omega_t$, the average value of the luminance levels is $m_t$, and the variance is $\sigma_t$. Furthermore, in the histogram shown in FIG. 15, a threshold $TH_1$ of the luminance level is set, and the pixels are separated into two values, a white class having a luminance level equal to or greater than the threshold $TH_1$ and a black class having a luminance level less than the threshold $TH_1$. Then, it is assumed that the number of pixels in the black class is $\omega_1$, the average value of the luminance level is $m_1$, the variance is $\sigma_1$, the number of pixels in the white class is $\omega_2$, the average value of the luminance level is $m_2$, and the variance is $\sigma_2$. The variance in the class $\omega_w^2$ is calculated according to the following Equation (1), the variance in the class $\sigma_b^2$ is calculated according to the following Equation (2), and total variance $\sigma_t^2$ is calculated according to the following Equation (3) on the basis of the variance in the class $\sigma_w^2$ and the variance in the class $\sigma_b^2$. Then, the degree of separation is calculated by obtaining the threshold $TH_1$ that maximizes the ratio of the variance in the class $\sigma_b^2$ and the variance in the class $\sigma_w^2$ shown in the following Equation (4). Then, the determination unit 605 can determine that the degree of contrast of the image is strong if the degree of separation is high.

[Math. 1]
$$\sigma_w^2 = \frac{\varpi_1 \sigma_1^2 + \varpi_2 \sigma_2^2}{\omega_1 + \omega_2} \quad (1)$$

[Math. 2]
$$\sigma_b^2 = \frac{\varpi_1(m_1 - m_{2t})^2 + \varpi_2(m_2 - m_t)^2}{\varpi_1 + \varpi_2} = \frac{\varpi_1 \varpi_2 (m_1 - m_2)^2}{(\varpi_1 + \varpi_2)^2} \quad (2)$$

[Math. 3]
$$\sigma_t^2 = \sigma_b^2 + \sigma_w^2 \quad (3)$$

[Math. 4]
$$\frac{\sigma_b^2}{\sigma_w^2} = \frac{\sigma_b^2}{\sigma_t^2 - \sigma_b^2} \quad (4)$$

Figure 16:
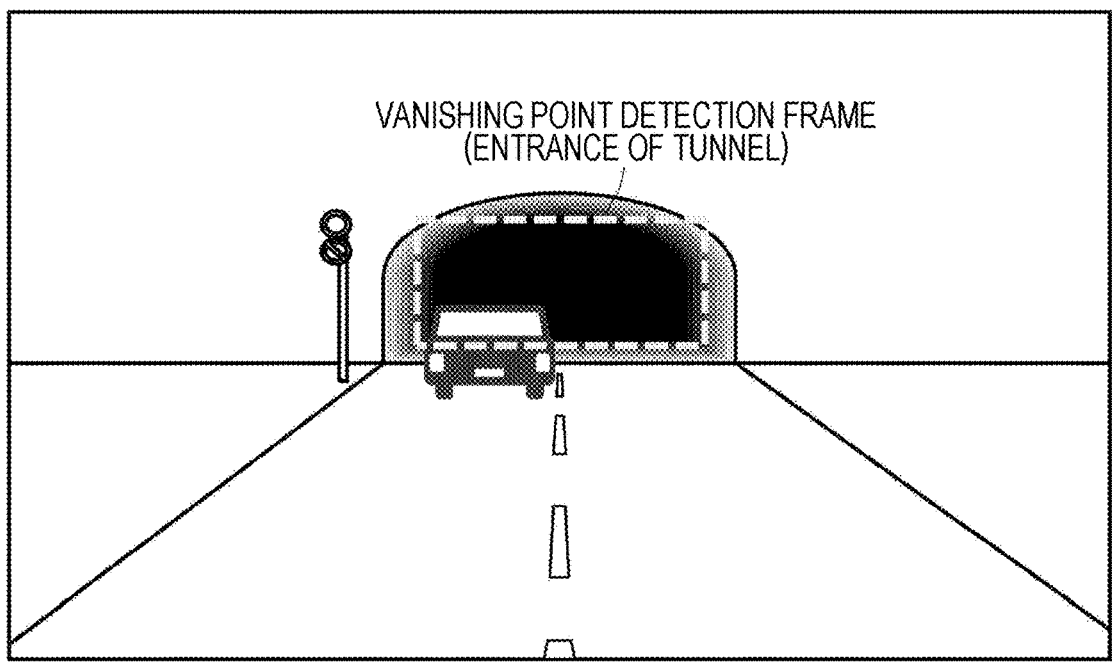
FIG. 16 is a diagram showing a situation where the vanishing point detection frame is arranged at a tunnel entrance.
Figure 17:
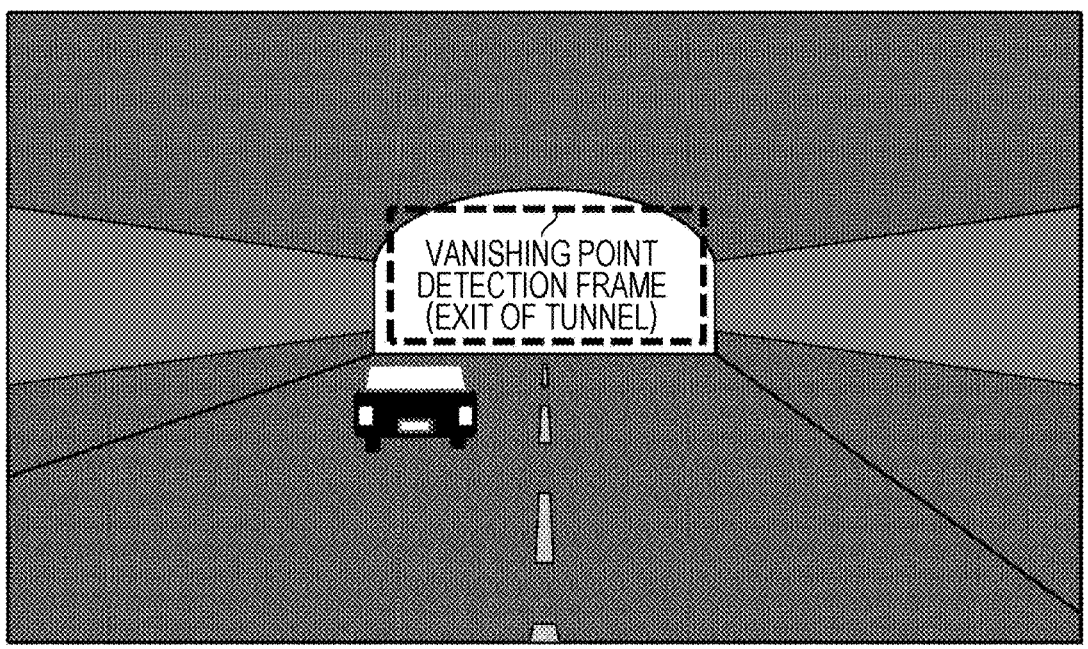
FIG. 17 is a diagram showing a situation where the vanishing point detection frame is arranged at a tunnel exit.

Control of Convergence Speed of Automatic Exposure Control:

FIG. 16 shows a situation where the imaging apparatus 600 images the front of the own vehicle when the own vehicle reaches the vicinity of the entrance of the tunnel. In this case, the entrance of the tunnel is the vanishing point region, and the detection value of the vanishing point region is less than the lower limit threshold $TH_{low}$. Furthermore, FIG. 17 shows a situation where the imaging apparatus 600 images the front of the own vehicle when the own vehicle reaches the vicinity of the exit of the tunnel. In this case, the exit of the tunnel is the vanishing point region, and the detection value of the vanishing point region exceeds the upper limit threshold $TH_{High}$.

In step S706 in the flowchart shown in FIG. 7, in a case where the detection value in the vanishing point region is less than the lower limit threshold $TH_{low}$ or exceeds the upper limit threshold $TH_{High}$, the determination unit 605 estimates that the own vehicle reaches the vicinity of the entrance or exit of the tunnel. Then, as shown in FIGS. 16 and 17, the determination unit 605 sets the detection frame only in the vanishing point region corresponding to the entrance or exit of the tunnel (step S712). Furthermore, in step S713, in order to avoid a situation where it takes too much time to reach an appropriate exposure condition and it becomes impossible to follow, the control unit 606 accelerates the convergence speed of the automatic exposure control.

Figure 18:
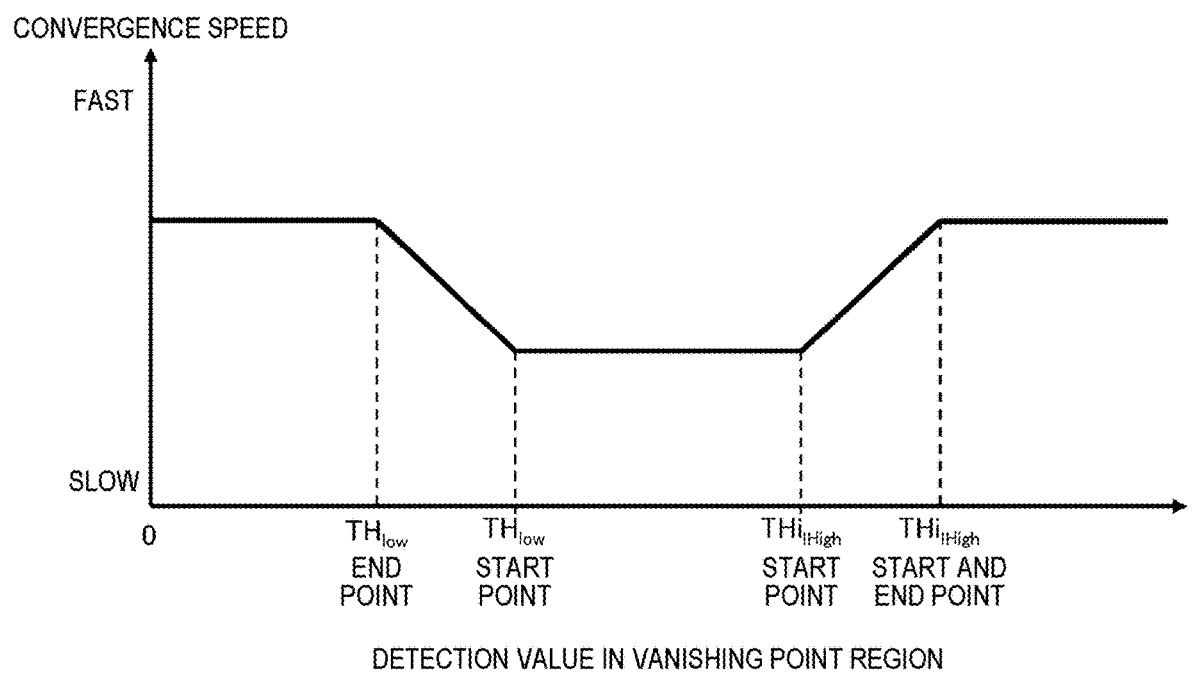
FIG. 18 is a diagram showing a relationship between a vanishing point detection value and a convergence speed of automatic exposure control.

FIG. 18 shows a relationship between a vanishing point detection value and a convergence speed of automatic exposure control. As shown in the drawing, in a case where the detection value in the vanishing point region becomes less than the lower limit threshold $TH_{low}$, the determination unit 605 accelerates the convergence speed of the automatic exposure control. Furthermore, in a case where the detection value in the vanishing point region exceeds the upper limit threshold $TH_{High}$, the determination unit 605 accelerates the convergence speed of the automatic exposure control. The determination unit 605 can realize continuous variable control of the convergence speed by monitoring the detection value in the vanishing point region in time series.

Furthermore, the determination unit 605 constantly monitors the front of the own vehicle on the basis of the vehicle recognition information by the recognition unit 604 even during the period when the detection value in the vanishing point region is within the range equal to or greater than the lower limit threshold $TH_{low}$ and less than the upper limit threshold $TH_{High}$. For example, also in a case where the image recognition results for several past frames are accumulated, and the state where the preceding vehicle cannot be recognized continues for a predetermined number of frames or more, the convergence speed of the automatic exposure control may be increased.

Regarding Weighting Control of Vehicle Frame:

When the determination unit 605 acquires the image recognition information by the recognition unit 604 in step S701 in the flowchart shown in FIG. 7, the determination unit 605 arranges a detection frame for each of the sky, the vanishing point, and the preceding vehicle. At this time, the determination unit 605 controls the weighting of each vehicle frame on the basis of the distance and relative speed of each preceding vehicle.

Figure 19:
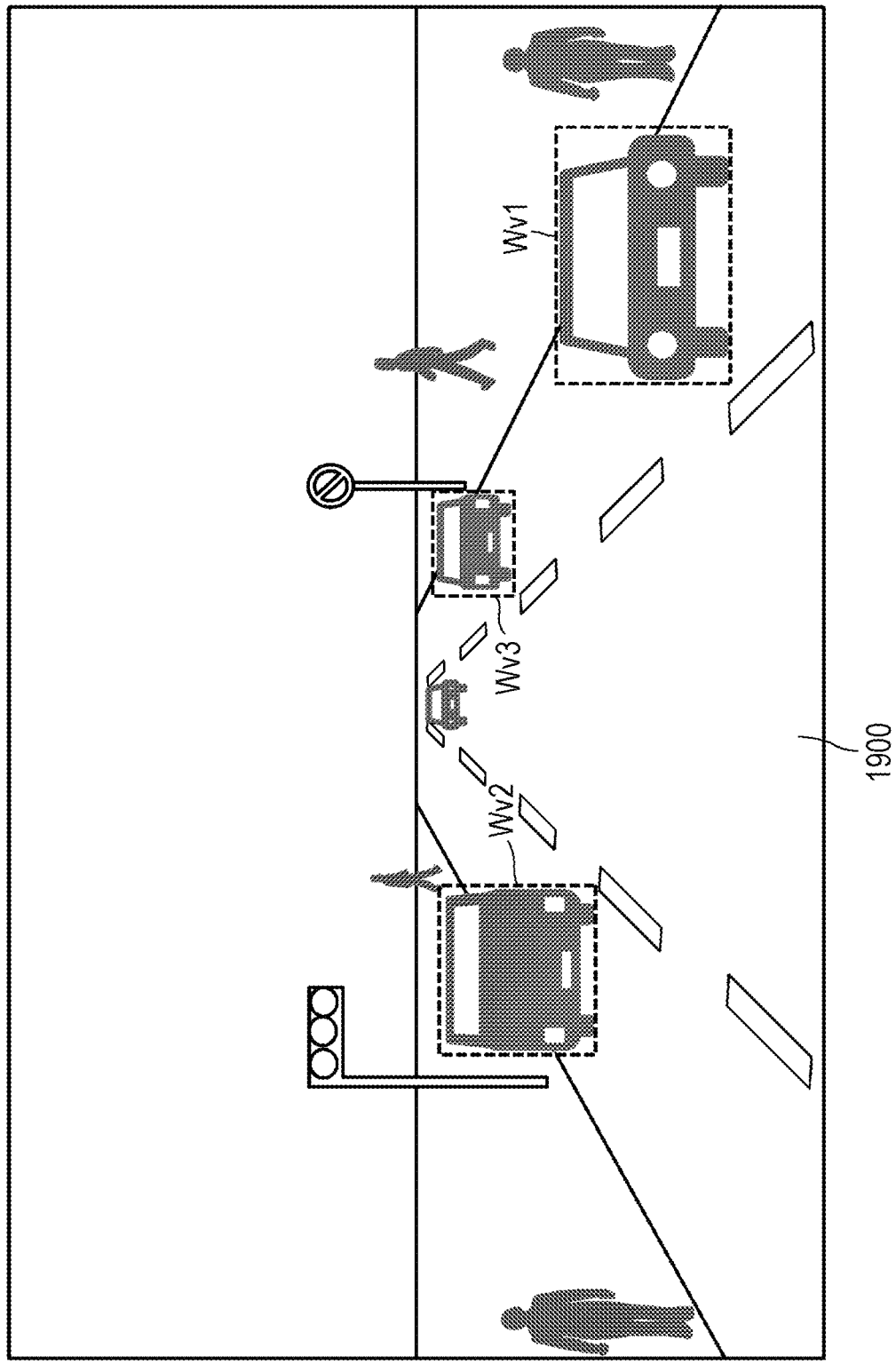
FIG. 19 is a diagram illustrating a landscape imaged by the imaging apparatus 600.
Figure 20:
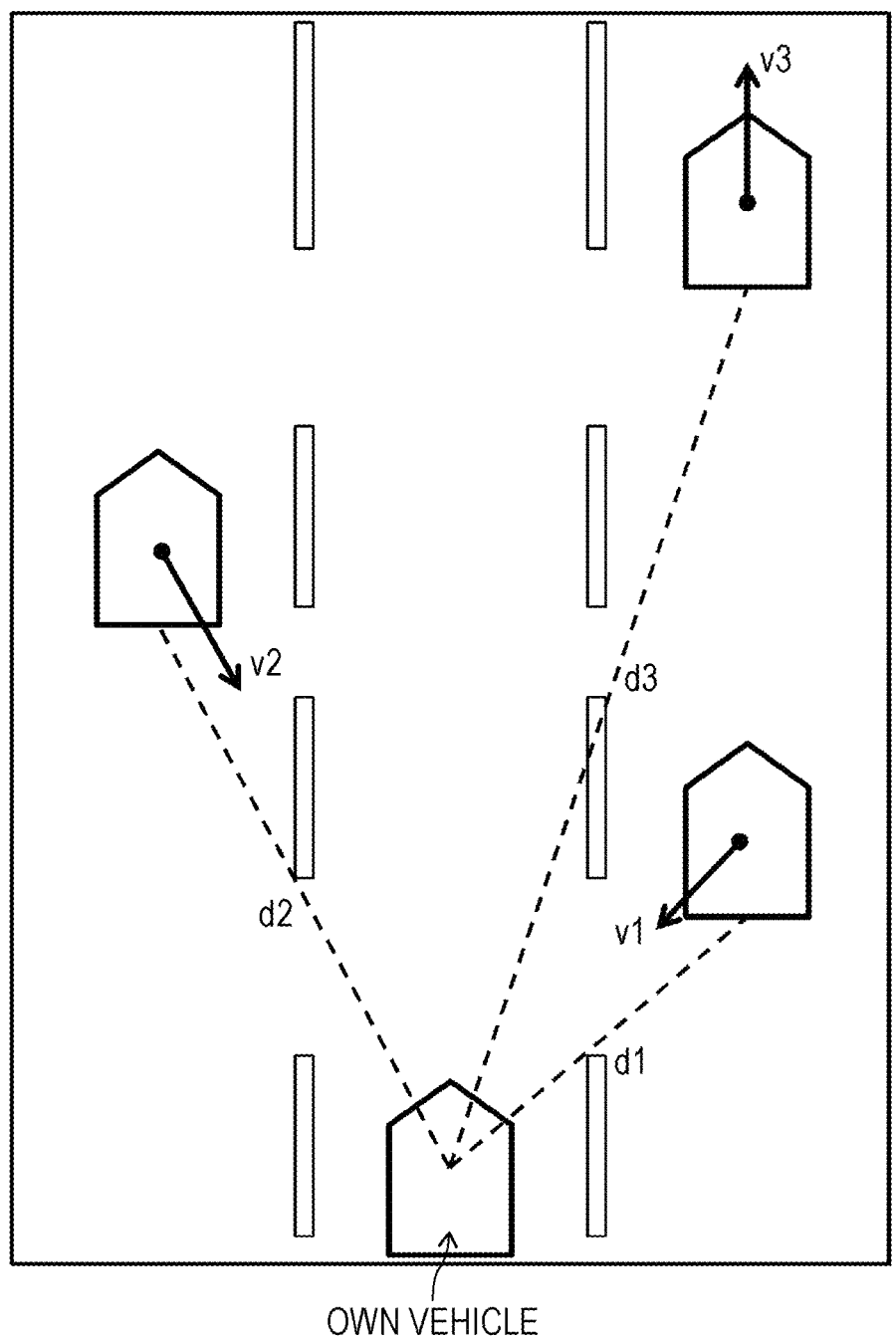
FIG. 20 is a diagram showing the distance and relative speed of each vehicle shown in the captured image shown in FIG. 19.

For example, it is assumed that vehicle frames Wv1, Wv2, Wv3 are arranged from the captured image 1900 of the image sensor 602 as shown in FIG. 19 on the basis of the image recognition information by the recognition unit 604. Furthermore, as shown in FIG. 20, it is assumed that the distances from the own vehicle to each preceding vehicle are d1, d2, d3, and the relative speeds of each preceding vehicle are v1, v2, v3.

If the distance to the preceding vehicle is short, there is a high possibility of collision with the own vehicle, so that a large weight should be given. Furthermore, the faster the relative speed of the preceding vehicle, the more likely it is to collide with the own vehicle, so that a greater weight should be given. Therefore, as shown in the following Equation (5), weights $W_ev1$, $W_ev2$, $W_ev3$ of each vehicle frame Wv1, Wv2, Wv3 may be controlled on the basis of the distance and the relative speed to the preceding vehicle.

[Math. 5]

$$W_e v1(v1/d1) > W_e v2(v2/d2) > W_e v3(-v3/d3) \quad (5)$$

Furthermore, the weight may be changed between the vehicle frame Wv of all the vehicles image-recognized by the recognition unit 604 and the other regions. For example, the weight $W_e v$ of the vehicle frame of all vehicles can be defined as in the following Equation (6) (however, in the example shown in FIG. 19, n=3).

[Math. 6]

$$w_e v = (w_e v1 + w_e v2 + \ldots + w_e vn)/n \quad (6)$$

Finally, the second embodiment will be summarized. The imaging apparatus 600 can be configured as single exposure, single detection, and single development, but has characteristics capable of maintaining stable exposure even with a sudden change in the subject, capable of coping with a plurality of changes in the subject, and capable of maintaining the subject detection function.

INDUSTRIAL APPLICABILITY

The technology disclosed in the present specification has been described in detail with reference to specific embodiments. However, it is obvious that those skilled in the art can make modifications and substitutions of the embodiments without departing from the gist of the technology disclosed in the present specification.

Although the description has focused on embodiments relating to the in-vehicle camera in the present specification, the scope of application of the technology disclosed in the present specification is not limited to the vehicle. For example, the technology disclosed in the present specification can be similarly applied to various types of mobile devices, such as unmanned aerial vehicles such as drones, robots that autonomously move in a given workspace (home, office, factory, or the like), ships, aircraft, or the like. Of course, the technology disclosed in the present specification can be similarly applied to an information terminal installed in a mobile device and various non-mobile devices.

In short, the technology disclosed in the present specification has been described in the form of exemplification, and the contents of the description of the present specification should not be interpreted restrictively. In order to determine the gist of the technology disclosed in the present specification, the scope of claims should be taken into consideration.

Note that the technology disclosed in the present specification may have the following configuration.

(1) An information processing apparatus including:
a recognition unit that recognizes an image after an output signal of an image sensor is processed by a processing unit; and
a control unit that controls at least one of imaging operation of the image sensor or processing operation in the processing unit on the basis of a recognition result of the recognition unit.
(1-1) The information processing apparatus according to (1) described above, further including the processing unit.

(2) The information processing apparatus according to (1) described above,
in which the control unit controls detection or development processing of a region of an object recognized by the recognition unit.
(3) The information processing apparatus according to any one of (1) or (2) described above,
in which the image sensor is mounted on a vehicle and used,
the recognition unit image-recognizes at least a surrounding vehicle or road surface, and
the control unit controls detection or development processing of a region of the surrounding vehicle or road surface in the image.
(4) The information processing apparatus according to (1) described above,
in which the control unit determines a scene on the basis of the recognition result by the recognition unit, and controls the imaging operation of the image sensor or the processing operation in the processing unit correspondingly to the scene.
(5) The information processing apparatus according to (1) described above,
in which the control unit calculates a vanishing point of the image on the basis of the recognition result by the recognition unit, and in a case where luminance of a region including the vanishing point deviates from a predetermined threshold range, the control unit sets only the region including the vanishing point as a photometric region, and accelerates convergence speed of automatic exposure control of the image sensor.
(6) The information processing apparatus according to (5) described above,
in which the control unit calculates the vanishing point on the basis of an intersection of two or more lanes recognized by the recognition unit.
(7) The information processing apparatus according to any one of (1), (4) to (6) described above,
in which, when the recognition unit stably recognizes a predetermined object, the control unit controls the imaging operation of the image sensor or the processing operation in the processing unit only in a region including the predetermined object.
(8) The information processing apparatus according to any one of (1), (4) to (7) described above,
in which the image sensor is mounted on a vehicle and used, and the recognition unit image-recognizes at least a surrounding vehicle, and
when the recognition unit can stably recognize a vehicle, the control unit detects a recognized vehicle region, and controls the imaging operation of the image sensor or the processing operation in the processing unit only in the vehicle region.
(9) The information processing apparatus according to any one of (1), (4) to (8) described above,
in which the image sensor is mounted on a vehicle and used, and the recognition unit image-recognizes at least a road surface, and
the control unit calculates a degree of contrast of the image, and when the degree of contrast becomes equal to or greater than a predetermined threshold, the control unit detects a recognized road surface region, and controls the imaging operation of the image sensor or the processing operation in the processing unit only in the road surface region.

(10) The information processing apparatus according to (9) described above,
in which the control unit calculates the degree of contrast of the image on the basis of a difference in luminance between the recognized road surface region and other regions.

(11) The information processing apparatus according to (9) described above,
in which the control unit calculates the degree of contrast of the image on the basis of a histogram of the image.

(12) The information processing apparatus according to any one of (1) to (11) described above,
in which the image sensor is mounted on a vehicle and used, and the recognition unit image-recognizes at least a surrounding vehicle, and
the control unit controls a weight on the basis of a distance and a relative speed to each of the surrounding vehicles.

(13) The information processing apparatus according to (12) described above,
in which the control unit controls weights of the vehicle region and other regions.

(14) An information processing method including:
a recognition step of recognizing an image after an output signal of an image sensor is processed by a processing unit; and
a control step of controlling at least one of imaging operation of the image sensor or processing operation in the processing unit on the basis of a recognition result in the recognition step.

(15) An imaging apparatus including:
an image sensor;
a processing unit that processes an output signal of the image sensor;
a recognition unit that recognizes an image after being processed by the processing unit; and
a control unit that controls at least one of imaging operation of the image sensor or processing operation in the processing unit on the basis of a recognition result of the recognition unit.

(16) A mobile device including:
a mobile body;
an image sensor mounted on the mobile body;
a processing unit that processes an output signal of the image sensor;
a recognition unit that recognizes an image after being processed by the processing unit;
a control unit that controls at least one of imaging operation of the image sensor or processing operation in the processing unit on the basis of a recognition result of the recognition unit; and
an operation control unit that controls operation in the mobile body on the basis of a result of recognition of a captured image by the image sensor under control of the control unit.

(17) A computer program written in a computer-readable format to cause a computer to function as
a recognition unit that recognizes an image after an output signal of an image sensor is processed by a processing unit, and
a control unit that controls at least one of imaging operation of the image sensor or processing operation in the processing unit on the basis of a recognition result of the recognition unit.

REFERENCE SIGNS LIST

100 Vehicle control system
101 Input unit
102 Data acquisition unit
103 Communication unit
104 Vehicle interior device
105 Output control unit
106 Output unit
107 Drive system control unit
108 Drive system
109 Body system control unit
110 Body system
111 Storage unit
112 Automatic driving control unit
121 Communication network
131 Detection unit
132 Self-position estimation unit
133 Situation analysis unit
134 Planning unit
135 Operation control unit
141 Vehicle exterior information detection unit
142 Vehicle interior information detection unit
143 Vehicle state detection unit
151 Map analysis unit
152 Traffic rule recognition unit
153 Situation recognition unit
154 Situation prediction unit
161 Route planning unit
162 Behavior planning unit
163 Operation planning unit
171 Emergency avoidance unit
172 Acceleration and deceleration control unit
173 Direction control unit
200 Imaging apparatus
201 Lens
202 Image sensor
203 Signal processing unit
204 Recognition unit
205 Control unit
301 Shutter
302 Element unit
303 Analog gain processing unit
304 Development processing unit
305 Detection unit
306 Comparison unit
401 Shutter
402 Element unit
403 Analog gain processing unit
404-1 Vehicle development processing unit
404-2 Road surface development processing unit
404-3 Entire screen development processing unit
405-1 Vehicle detection unit
405-2 Road surface detection unit
405-3 Entire screen detection unit
406 Comparison unit
600 Imaging apparatus
601 Lens
602 Image sensor
603 Signal processing unit
604 Recognition unit
605 Determination unit
606 Control unit

The invention claimed is:
1. An information processing apparatus comprising:
processing circuitry configured to:
acquire, from an image sensor, two or more images in which device control has been performed, wherein the two or more images are captured by multiple simultaneous exposure;

perform recognition of target objects in respective ones of the two or more captured images;

perform simultaneous detection of a brightness of each of the target objects in the respective ones of the captured images based on the recognition of the target objects;

perform simultaneous calculation of a brightness error of each of the target objects based on the detected brightness of each of the target objects; and perform simultaneous development processing of each of the captured images based on the calculated brightness error of each of the target objects to provide developed images for performing operation control.

2. The information processing apparatus according to claim 1, wherein the processing circuitry is configured to control detection or development processing of a region of a recognized target object.

3. The information processing apparatus according to claim 1, wherein the image sensor is mounted on a vehicle, and the processing circuitry is configured to recognize at least a surrounding vehicle or road surface, and to control detection or development processing of a region of the surrounding vehicle or road surface in the image.

4. The information processing apparatus according to claim 1, wherein the processing circuitry is configured to determine a scene on a basis of the recognized target objects, and to control an imaging operation of the image sensor or a processing operation corresponding to the scene.

5. The information processing apparatus according to claim 1, wherein the processing circuitry is configured to calculate a vanishing point of the captured image on a basis of a recognized target object, and in a case where luminance of a region including the vanishing point deviates from a predetermined threshold range, the processing circuitry is configured to set only the region including the vanishing point as a photometric region, and to accelerate convergence speed of automatic exposure control of the image sensor.

6. The information processing apparatus according to claim 5, wherein the processing circuitry is configured to calculate the vanishing point on a basis of an intersection of two or more lanes on a road surface.

7. The information processing apparatus according to claim 1, wherein, when a predetermined object is stably recognized, the processing circuitry is configured to control an imaging operation of the image sensor or a processing operation only in a region including the predetermined object.

8. The information processing apparatus according to claim 1, wherein the image sensor is mounted on a vehicle, and the processing circuitry is configured to recognize at least a surrounding vehicle, and when a vehicle is stably recognized, the processing circuitry is configured to detect a recognized vehicle region, and to control an imaging operation of the image sensor or a processing operation only in the vehicle region.

9. The information processing apparatus according to claim 1, wherein the image sensor is mounted on a vehicle, and a road surface is recognized, and the processing circuitry is configured to calculate a degree of contrast of the image, and when the degree of contrast becomes equal to or greater than a predetermined threshold, the processing circuitry is configured to control an imaging operation of the image sensor or a processing operation only in a road surface region.

10. The information processing apparatus according to claim 9, wherein the processing circuitry is configured to calculate the degree of contrast of the image on a basis of a difference in luminance between the recognized road surface region and other regions.

11. The information processing apparatus according to claim 9, wherein the processing circuitry is configured to calculate the degree of contrast of the image on a basis of a histogram of the image.

12. The information processing apparatus according to claim 1, wherein the image sensor is mounted on a vehicle, and a surrounding vehicle is recognized, and the processing circuitry is configured to control a weight on a basis of a distance and a relative speed to each of surrounding vehicles.

13. The information processing apparatus according to claim 12, wherein the processing circuitry is configured to control weights of a vehicle region and other regions.

14. An information processing method comprising:

acquiring two or more images in which device control has been performed, wherein the two or more images are captured by multiple simultaneous exposure;

performing recognition of target objects in respective ones of the two or more captured images;

performing simultaneous detection of a brightness of each of the target objects in the respective ones of the captured images based on the recognition of the target objects;

performing simultaneous calculation of a brightness error of each of the target objects based on the detected brightness of each of the target objects; and performing simultaneous development processing of each of the captured images based on the calculated brightness error of each of the target objects to provide developed images for performing operation control.

15. An imaging apparatus comprising:

an image sensor; and processing circuitry configured to:

acquire, from the image sensor, two or more images in which device control has been performed, wherein the two or more images are captured by multiple simultaneous exposure;

perform recognition of target objects in respective ones of the two or more captured images;

perform simultaneous detection of a brightness of each of the target objects in the respective ones of the captured images based on the recognition of the target objects;

perform simultaneous calculation of a brightness error of each of the target objects based on the detected brightness of each of the target objects; and perform simultaneous development processing of each of the captured images based on the calculated brightness error of each of the target objects to provide developed images for performing operation control.

16. A mobile device comprising:
a mobile body;
an image sensor mounted on the mobile body;
processing circuitry configured to:
acquire, from the image sensor, two or more images in which device control has been performed, wherein the two or more images are captured by multiple simultaneous exposure;
perform recognition of target objects in respective ones of the two or more captured images;
perform simultaneous detection of a brightness of each of the target objects in the respective ones of the captured images based on the recognition of the target objects;
perform simultaneous calculation of a brightness error of each of the target objects based on the detected brightness of each of the target objects; and
perform simultaneous development processing of each of the captured images based on the calculated brightness error of each of the target objects to provide developed images; and
an operation controller configured to control operation of the mobile body on a basis of the developed images.

17. A non-transitory computer readable medium storing instructions that, when executed by processing circuitry, perform an information processing method comprising:
acquiring two or more images in which device control has been performed wherein the two or more images are captured by multiple simultaneous exposure;
performing recognition of target objects in respective ones of the two or more captured images;
performing simultaneous detection of a brightness of each of the target objects in the respective ones of the captured images based on the recognition of the target objects;
performing simultaneous calculation of a brightness error of each of the target objects based on the detected brightness of each of the target objects; and
performing simultaneous development processing of each of the captured images based on the calculated brightness error of each of the target objects to provide developed images for performing operation control.

* * * * *